(12) United States Patent
Chien

(10) Patent No.: US 7,542,174 B2
(45) Date of Patent: Jun. 2, 2009

(54) IMAGE PROCESSING METHOD FOR REDUCING JAGGY EFFECT

(75) Inventor: Hui-Jan Chien, Taipei (TW)

(73) Assignee: Qisda Corporation, Taoyuan County (TW)

( * ) Notice: Subject to any disclaimer, the term of this patent is extended or adjusted under 35 U.S.C. 154(b) by 713 days.

(21) Appl. No.: 10/974,887

(22) Filed: Oct. 28, 2004

(65) Prior Publication Data

US 2005/0219633 A1 Oct. 6, 2005

(30) Foreign Application Priority Data

Nov. 25, 2003 (TW) .............................. 92133102 A

(51) Int. Cl.
G06T 5/00 (2006.01)
H04N 1/407 (2006.01)
H04N 1/409 (2006.01)
G06K 9/40 (2006.01)

(52) U.S. Cl. .................... 358/3.27; 358/1.2; 358/1.9; 358/3.06; 358/3.07; 358/3.24; 358/3.26; 358/525; 358/532; 358/534; 358/536; 382/237; 382/242; 382/264; 382/266; 382/267; 382/268; 382/269; 382/299; 345/611

(58) Field of Classification Search ................ 358/3.03, 358/3.06, 3.13, 3.26–3.27, 534; 345/611, 345/615; 382/237, 242, 252, 254–275
See application file for complete search history.

(56) References Cited

U.S. PATENT DOCUMENTS

| 4,466,122 | A | * | 8/1984 | Auerbach | .................... 382/191 |
| 4,780,711 | A | * | 10/1988 | Doumas | ...................... 345/614 |
| 4,851,825 | A | * | 7/1989 | Naiman | ....................... 345/596 |
| 5,333,211 | A | * | 7/1994 | Kanda et al. | ................. 382/261 |
| 5,430,557 | A | * | 7/1995 | Tamura et al. | .............. 358/3.06 |
| 5,473,439 | A | * | 12/1995 | Pappas | ....................... 358/3.27 |
| 5,500,685 | A | * | 3/1996 | Kokaram | ...................... 348/620 |
| 5,537,495 | A | * | 7/1996 | Overton | ...................... 382/269 |
| 5,559,530 | A | * | 9/1996 | Yamashita et al. | .......... 345/611 |
| 5,563,721 | A | * | 10/1996 | Overton | ...................... 358/447 |
| 5,742,277 | A | * | 4/1998 | Gossett et al. | .............. 345/611 |
| 5,742,703 | A | * | 4/1998 | Lin et al. | ..................... 382/176 |
| 5,920,648 | A | * | 7/1999 | Fujimoto | .................... 382/197 |
| 5,991,513 | A | * | 11/1999 | Levien | ....................... 358/3.26 |
| 6,101,514 | A | * | 8/2000 | Chan | .......................... 715/232 |
| 6,289,136 | B1 | * | 9/2001 | Oshino et al. | ............... 382/298 |
| 6,356,278 | B1 | * | 3/2002 | Stamm et al. | ............... 345/611 |
| 6,603,564 | B1 | * | 8/2003 | Miyaki | ...................... 358/1.12 |
| 6,680,786 | B1 | * | 1/2004 | Sato et al. | ................... 358/3.18 |
| 6,700,672 | B1 | * | 3/2004 | Jones et al. | .................. 358/1.1 |
| 6,791,717 | B1 | * | 9/2004 | Ariga | .......................... 358/2.1 |
| 6,891,549 | B2 | * | 5/2005 | Gold | .......................... 345/611 |
| 6,944,341 | B2 | * | 9/2005 | Loce et al. | .................. 382/209 |
| 6,982,723 | B1 | * | 1/2006 | Szymaniak | ................. 345/611 |

* cited by examiner

*Primary Examiner*—King Y Poon
*Assistant Examiner*—Richard Z Zhu

(57) ABSTRACT

An image processing method for reducing jaggy effect, which is applied in an image output device, is provided. Firstly, a continuous tone image is generated, and continuous tone pixels are defined according to a first addressing space. Then, a halftone image is generated. After that, the continuous tone image is low-pass filtered to generate a low-pass filtered image. Next, determine whether a position of the low-pass filtered image whose density is approximate to a pre-determined density. If so, generate a set of second addressing space co-ordinates of a key point corresponding to the position. Then, a moving vector corresponding to the key point is generated so as to regulate the position of a display point of the halftone pixel. Afterward, output the display point according to the position after regulation.

19 Claims, 19 Drawing Sheets

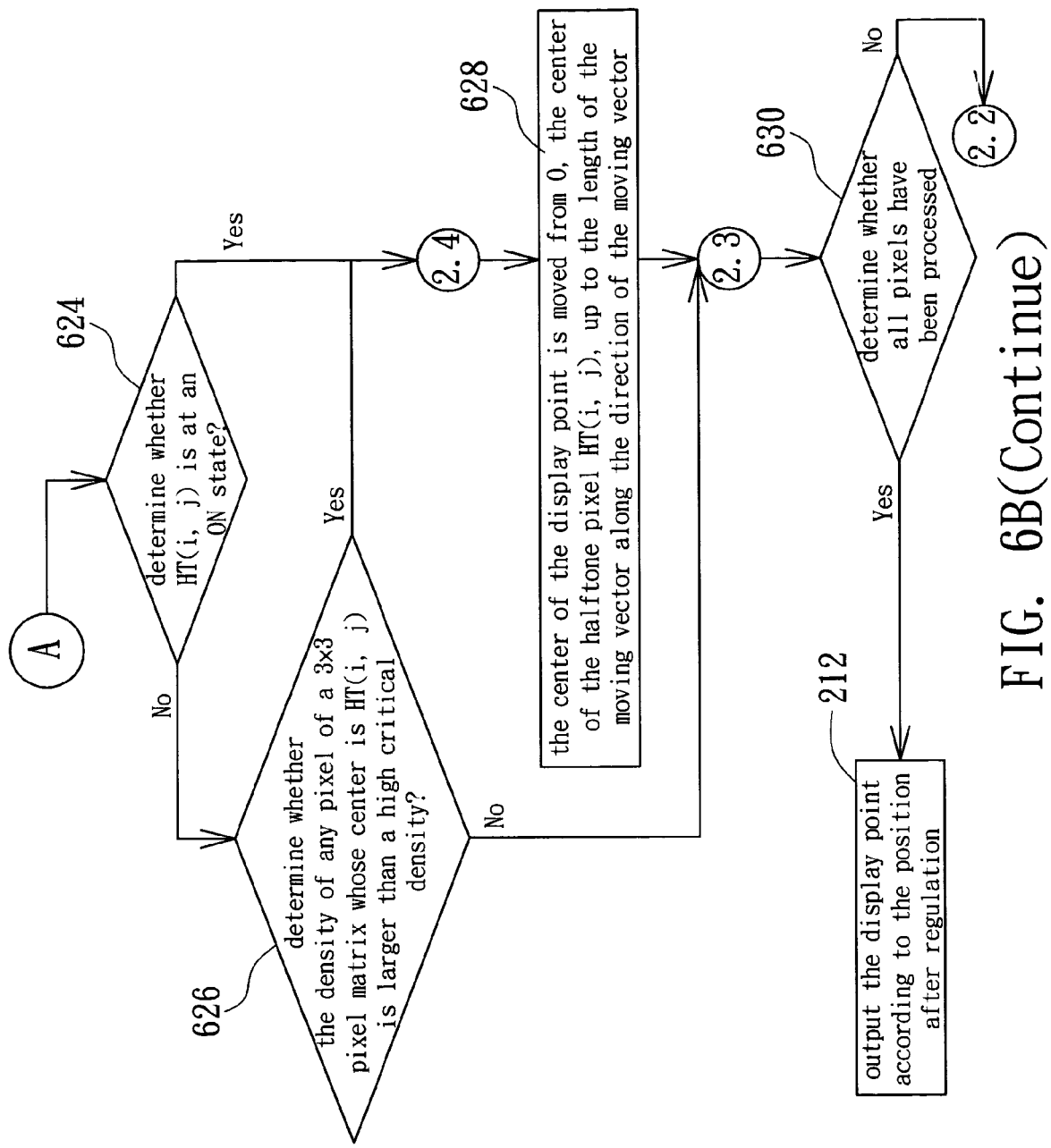
FIG. 6B(Continue)

Code=36(A)

Code=132(B)

Code=9(C)

Code=33(D)

Code=72(E)

Code=66(F)

Code=18(G)

Code=144(H)

←(1/3) →(1/3) ↑(1/3) ↓(1/3)

IMAGE PROCESSING METHOD FOR REDUCING JAGGY EFFECT

This application claims the benefit of Taiwan application Ser. No. 92133102, filed Nov. 25, 2003, the subject matter of which is incorporated herein by reference.

BACKGROUND OF THE INVENTION

1. Field of the Invention

The invention relates in general to an image processing method, and more particularly to an image processing method for reducing jaggy effect.

2. Description of the Related Art

Processing of image edges plays a very important role when it comes to achieving a high quality image. Particularly, the processing quality of high-contrast image edges of pictures or texts is crucial to image quality. In order to reduce computing time, ordinary ink-jet printers normally halftone process a document-to-be-printed to obtain a halftone binary image, and then have the document-to-be-printed printed out under a low-resolution printing mode. However, jaggy effect always occurs at the edges of the halftone binary image, which is not desired in a high quality image.

To resolve the jaggy effect, a method of encoding high-resolution edge position information in continuous tone image information is provided in U.S. Pat. No. 6,020,979. FIG. 1 shows a plurality of edge patterns, which could possibly be used in U.S. Pat. No. 6,020,979. Nevertheless, this method, which can regulate the edge position along fast scanning direction X only but cannot regulate the edge position along slow scanning direction Y, still cannot completely resolve the above-mentioned jaggy effect problem.

In addition, a method and apparatus for the resolution enhancement of gray-scale images that include text and line art is provided in U.S. Pat. No. 5,742,703, while liquid ink printing system having region-dependent image processing is provided in U.S. Pat. No. 5,778,160. However, the technologies disclosed in both patents involve segmentation operation and template matching procedure, which are complicated in nature, require a large amount of computing time and are energy-consuming as well. How to design a simple yet efficient method to resolve the jaggy effect in the output image of ink-jet printer has thus become an imminent challenge to professionals in the industry.

SUMMARY OF THE INVENTION

It is therefore an object of the invention to provide an image processing method for reducing jaggy effect. The invention uses horizontal compensation and vertical compensation as well to resolve the jaggy effect without using too many operations. The invention, which achieves a high-resolution image quality under a low-resolution printing mode, has the advantages of having fast image outputting and having high quality images.

The invention achieves the above-identified object by providing an image processing method applied in an image output device for reducing jaggy effect. Firstly, generate a continuous tone image having a plurality of continuous tone pixels, wherein the co-ordinates of the continuous tone pixels are defined according to a first addressing space with each of the continuous tone pixels having a continuous image density and one of the continuous tone pixels being I(i, j). Then, halftone-process the continuous tone image to generate a halftone image, which has a plurality of halftone pixels corresponding to the continuous tone pixels, wherein the halftone pixels can be at an ON state or an OFF state, while the halftone pixel HT(i, j) corresponds to continuous tone pixel I(i, j). After that, the continuous tone image is low-pass filtered to generate a low-pass filtered image having a plurality of low-pass filtered pixels corresponding to the continuous tone pixels, wherein a low-pass filtered pixel B(i, j) corresponds to the continuous tone pixel (i, j), and each of the low-pass filtered pixels has a low-pass filtered image density. Next, determine whether a position of the low-pass filtered image whose density is approximate to a pre-determined density can be obtained in the low-pass filtered pixel B(i, j). If so, define the position according to a second addressing space to obtain a set of second addressing space co-ordinates (Vr, Vc) of a key point KP(i, j) corresponding to the position. Then, determine whether the key point KP(i, j) corresponds to a convex image region or a concave image region according to the relationship between the key point KP(i, j) and at least two of its adjacent key points, obtain a moving vector corresponding to the key point, and regulate the position of a display point of the halftone pixel HT(i, j) according to the moving vector. Afterward, output the display point according to the position after regulation Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 8A is a diagram shows the relationship between a convex image region and a circle whose center is Q and radius is R, while

DETAILED DESCRIPTION OF THE INVENTION

Figure 1:
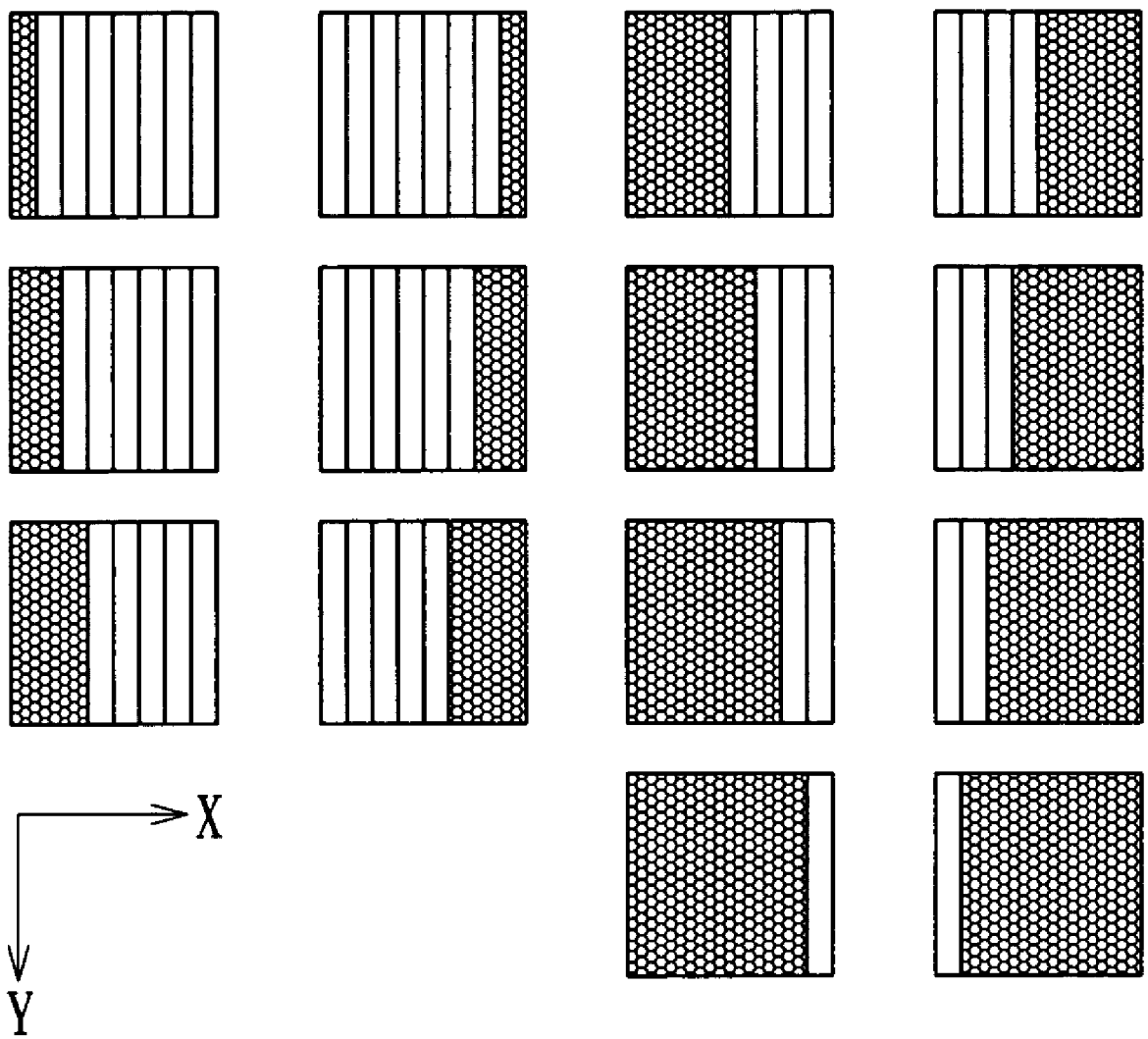
FIG. 1 shows a plurality of possible patterns that could be used in U.S. Pat. No. 6,020,979.
Figure 2:
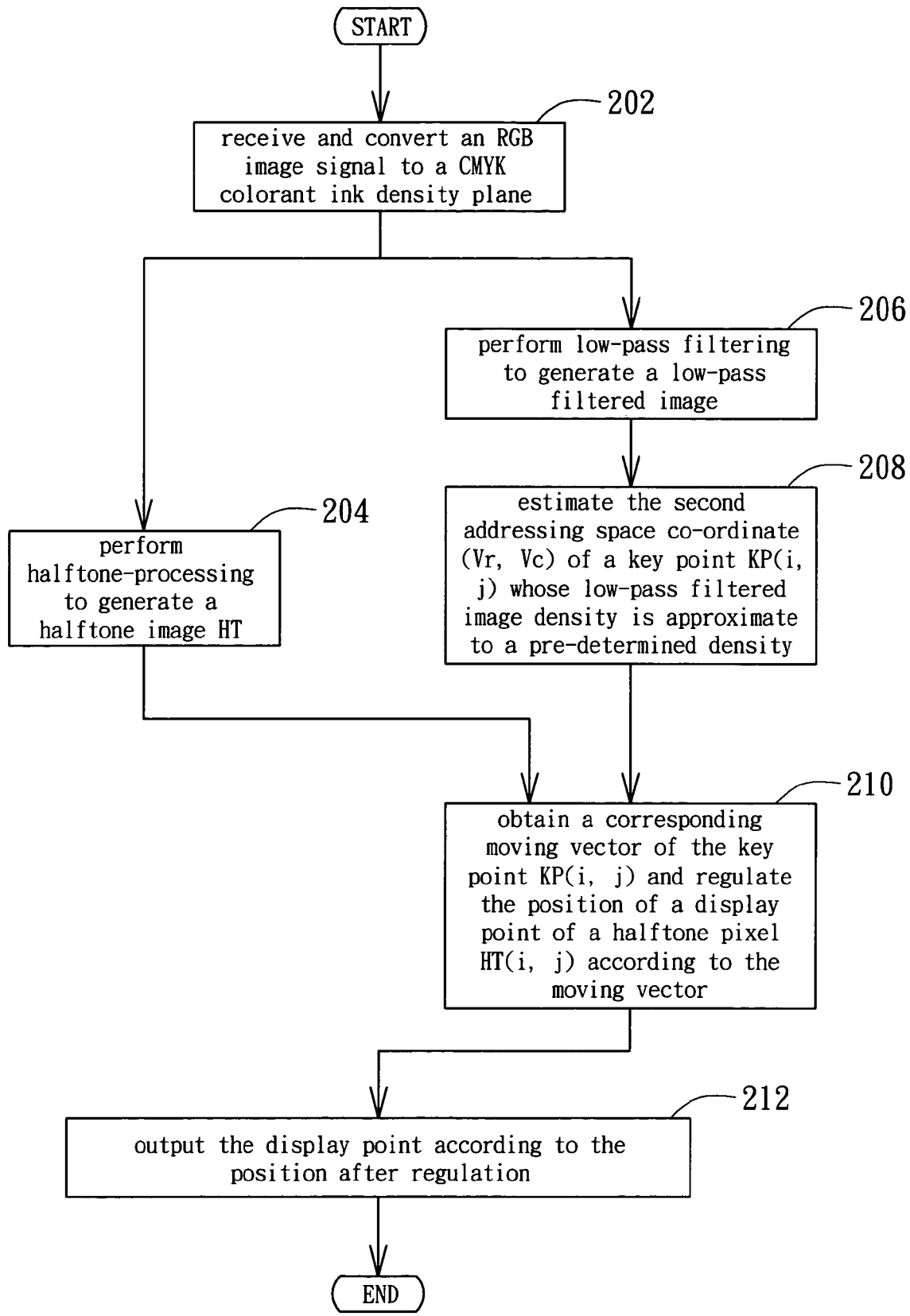
FIG. 2 shows a flowchart of an image processing method for reducing jaggy effect according to a preferred embodiment of the invention.

Referring to FIG. 2, a flowchart of an image processing method for reducing jaggy effect according to a preferred embodiment of the invention is shown. The method according to the invention is applied in an image output device, and preferably an ink-jet printer or a multi-functional office machine. The steps of the method according to the invention are disclosed below. Firstly, the method begins at step 202. The printer receives and converts an RGB image signal to a CMYK colorant ink density plane, which is a continuous tone density plane of cyaneus (C), magenta (M), yellow (Y) and black (K) colors. Let the continuous tone image I represent a CMYK density plane. The above conversion generates the CMYK density plane simultaneously by means of parallel processing. When assembled, the CMYK density plane will produce a visual effect approximate to the RGB image signal displayed on the screen.

The continuous tone image I has a plurality of continuous tone pixels, which define the positions of the continuous tone pixels according to a first addressing space such as a low-resolution addressing space. Let a continuous tone pixel $I(i, j)$ represent a continuous tone pixel at row i and column j of the continuous tone pixel $I(i, j)$ where i, j are positive integers. Moreover, the continuous tone pixel $I(i, j)$ has a continuous image density, which is a real number ranged between 0 and 1. Take the 256 gray scales for instance, a density whose value is 0 corresponds to a gray scale whose value is 0, while a density value whose value is 1 corresponds to a gray scale value whose value is 255.

Next, perform steps 204 and 206. In step 204, halftone-process the continuous tone image I to generate a halftone image HT, which has a plurality of halftone pixels corresponding to the continuous tone pixels, wherein the halftone pixels can be at an ON state or an OFF state, and the halftone pixel $HT(i, j)$ corresponds to the continuous tone pixel $I(i, j)$.

Figure 4:
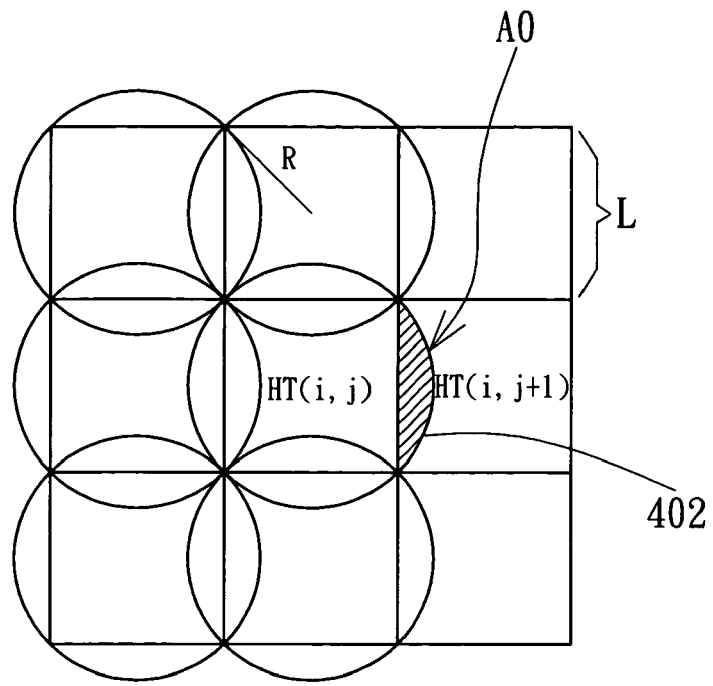
FIG. 4 is an example of partial halftone image before regulation.

Referring to FIG. 4, an example of partial halftone image before regulation. When a halftone pixel, $HT(i,j)$ for instance, is at an ON state, the halftone pixel has a display point 402; when a halftone pixel, $HT(i, j+1)$ for instance, is at an OFF state, the halftone pixel is without any display point. In an ink-jet printer, the display point, which is preferably to be circular, is an ink dot of one of the CMYK colors. If the pixel grid length of a pixel is L, the display point will have a radius R of $((2^{1/2})/2)L$, which is approximate to 0.707 L, the center of the display point is exactly the center of the pixel, and A0, the area of the slope-lined region of a display point convex outside a pixel grid, is equal to $((\pi/2-1))/4*L^2$.

In step 206, the continuous tone image I is low-pass filtered via a low-pass filter such as an anti-aliasing algorithm or Gaussian-blurred processing to generate a low-pass filtered image B, which has a plurality of low-passed filtered pixels corresponding to the continuous tone pixel I. The low-passed filtered pixel $B(i, j)$ has a low-pass filtered image density. Next, proceed to step 208.

In step 208, determine whether a position of the low-pass filtered image whose density is approximate to a pre-determined density can be obtained in a low-pass filtered pixel $B(i, j)$. If so, define the position according to a second addressing space to obtain a set of second addressing space co-ordinates (Vr, Vc) of a key point $KP(i, j)$ corresponding to the position. The second addressing space co-ordinates (Vr, Vc) are recorded in a contour function $Contour(i, j)$, wherein $Contour(i, j)=(r', c')$ r' and c' are real numbers ranged between −0.5 and 0.5. When (r', c') is equal to (0, 0), (r', c') represents the central point of a pixel $(i, j)$. When one of r' and c' is not equal to 0, the pixel $(i, j)$ has a key point $KP(i, j)$; when r' and c' are both equal to 0, the pixel $(i, j)$ is without a key point $KP(i, j)$. Of which, the pre-determined density is preferably to be 1/2; the second addressing space is preferably to be an addressing space of a higher resolution level; and a plurality of key points are linked together to form a virtual contour path. Then, proceed to step 210.

In step 210, determine whether the key point $KP(i, j)$ corresponds to a convex image region or a concave image region according to the relationship between the key point $KP(i, j)$ and at least two of its adjacent key points and obtain a moving vector corresponding to the key point $(i, j)$, so as to regulate the position of a display point of the halftone pixel $HT(i, j)$. Afterward, proceed to step 212 to output the display point according to the position after regulation.

The details of steps 206, 208 210 and 212 are elaborated below. In step 206, the Gaussian convolution of Gaussian-blurred processing is exemplified to illustrate how a continuous tone image I is low-pass filtered to obtain a low-pass filtered image B. Take the Gaussian convolution with a standard deviation, $\sigma=0.65$ pixel grids for example. The Gaussian convolution can be further simplified as a weighted operation of a 3×3 pixel matrix and various weights. The weights for the continuous tone pixel $I(i, j)$ and the 8 adjacent continuous tone pixels thereof are illustrated in Table 1.

TABLE 1

| Pixel | $I(i-1, j-1)$ | $I(i-1, j)$ | $I(i-1, j+1)$ |
|---|---|---|---|
| Weight | 0.035 | 0.12 | 0.035 |
| Pixel | $I(i, j-1)$ | $I(i, j)$ | $I(i, j+1)$ |
| Weight | 0.12 | 0.38 | 0.12 |
| Pixel | $I(i+1, j-1)$ | $I(i+1, j)$ | $I(i+1, j+1)$ |
| Weight | 0.035 | 0.12 | 0.035 |

The low-pass filtered image density of the low-pass filtered pixel $B(i, j)$ is a summation of the respective product of the continuous image densities of the continuous tone pixel $I(i, j)$ and the 8 adjacent continuous tone pixels thereof being multiplied by their respective weight. Therefore, the low-pass filtered image density of the low-pass filtered pixel $B(i, j)$ will encompass the local distribution information of the densities of the neighboring continuous tone pixels of the continuous tone pixel $I(i, j)$. The larger the standard deviation is, the local distribution information of a larger region will be encompassed in the low-pass filtered image density.

Figure 3A:
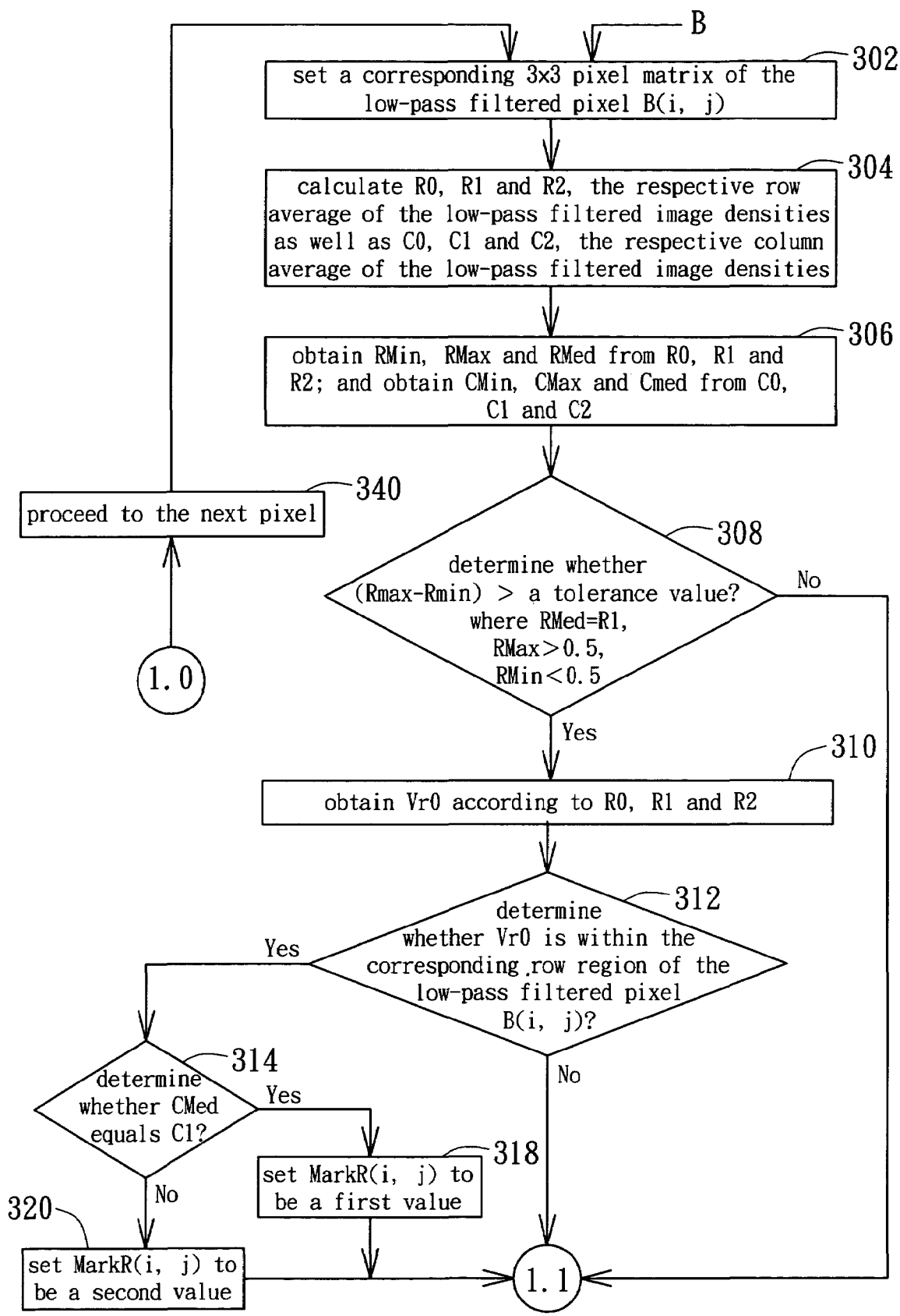
FIGS. 3A and 3B are a detailed flowchart of step 208 of estimating a key point KP(i, j)
Figure 3B:
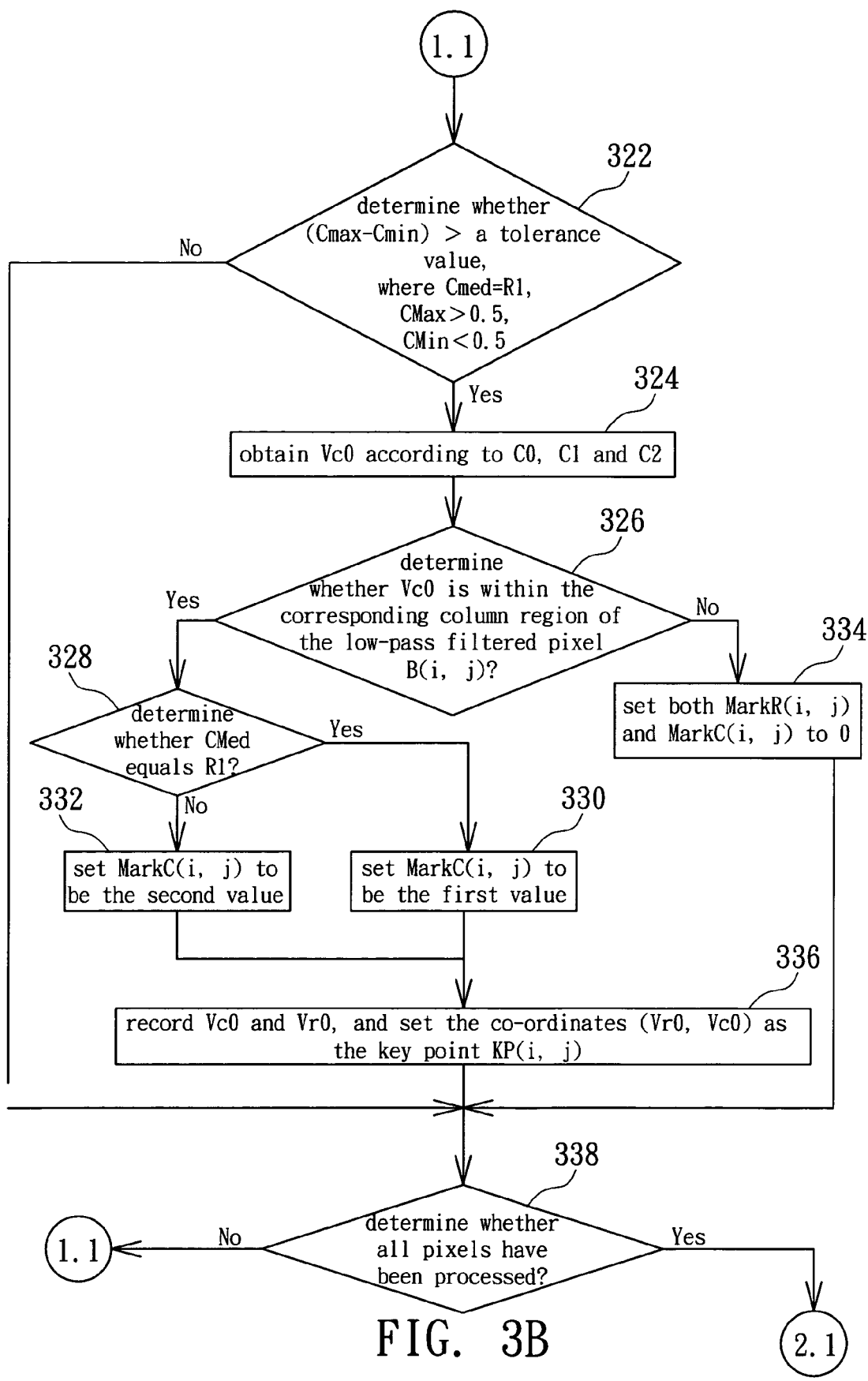

Referring to FIGS. 3A and 3B, a detailed flowchart of step 208 of estimating key point $KP(i, j)$ is shown. Following the step 206 of FIG. 2 in which the low-pass filtered image B is obtained, perform steps 302, 304, 306 and 308 sequentially to calculate plural row averages of the low-pass filtered image densities of plural rows of the low-pass filtered pixels disposed at a corresponding local region of the low-pass filtered pixel $B(i, j)$ as well as plural column averages of the low-pass filtered image densities of plural columns of the low-pass filtered pixels disposed at a corresponding local region of the low-pass filtered pixel $B(i, j)$.

In step 302, set a corresponding 3×3 pixel matrix of the low-pass filtered pixel $B(i, j)$, wherein $B(i, j)$ is disposed at the center of the 3×3 pixel matrix. That is to say, the 3×3 pixel matrix consists of low-pass filtered pixels of 3 rows and 3 columns, namely the low-pass filtered pixels disposed at row 0, row 1 and row 2, and the low-pass filtered pixels disposed at column 0, column 1 and column 2, wherein the low-pass filtered pixel $B(i, j)$ is a low-pass filtered pixel disposed at row 1 and column 1 in the corresponding 3×3 pixel matrix.

In step 304, calculate R0, R1 and R2, the respective average of the low-pass filtered image densities of the low-pass filtered pixels disposed at row 0, row 1 and row 2, as well as C0, C1 and C2, the respective average of the low-pass filtered image densities of the low-pass filtered pixels disposed at column 0, column 1 and column 2.

In step 306, let parameter RMin be equal to the minimum of R0, R1 and R2, parameter RMax be equal to the maximum of R0, R1 and R2, and parameter RMed be equal to the median of R0, R1 and R2; and let parameter CMin be equal to the minimum of C0, C1 and C2, parameter CMax be equal to the maximum of C0, C1 and C2, and parameter CMed be equal to the median of C0, C1 and C2.

In step 308, determine whether Rmax-Rmin is larger than a tolerance value, say, 0.5 for instance, where RMed=R1, RMax>0.5, RMin<0.5. If so, proceed to step 310; otherwise, proceed to step 322.

Figure 5:
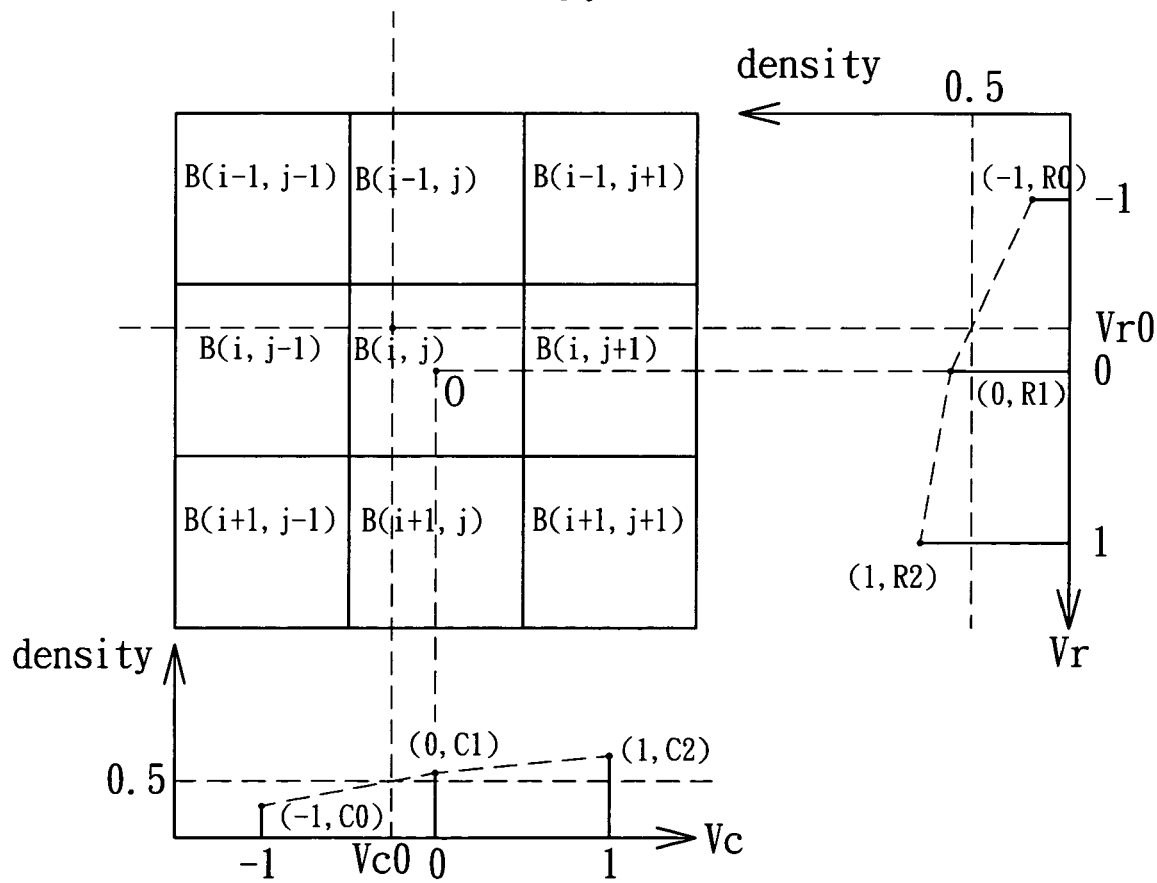
FIG. 5 shows the interpolation method of obtaining a set of second addressing space co-ordinates (Vr, Vc)

Next, proceed to step 310: use the interpolation method to obtain a second addressing space row co-ordinate Vr0 whose low-pass filtered image density is approximate to the pre-determined value, which is 0.5, according to row averages R0, R1 and R2. Referring to FIG. 5, a diagram showing the interpolation method of obtaining a set of second addressing space co-ordinates (Vr, Vc) of the key point KP(i, j). Let O, the central point of the low-pass filtered pixel B(i, j), be the original point of the second addressing space co-ordinates. The second addressing space co-ordinates of the central line of the low-pass filtered pixels disposed at row 0, row 1 and row 2 are respectively equal to −1, 0, and 1, which respectively corresponds to low-pass filtered image densities R0, R1 and R2. The second addressing space co-ordinates of the central line of the low-pass filtered pixels at column 0, column 1 and column 2 are respectively equal to −1, 0, and 1, which respectively correspond to low-pass filtered image densities C0, C1 and C2. By means of the segment formed by (−1, R0) and (0, R1) and the segment formed by (0, R1) and (1, R2), the second addressing space row co-ordinate Vr0 whose low-pass filtered image density equals 0.5 can be obtained via interpolation method.

Next, proceed to step 312: determine whether the second addressing space row co-ordinate Vr0 is within the corresponding row region of the low-pass filtered pixel B(i,j). If so, proceed to step 314; otherwise, proceed to step 322. During which step, whether the second addressing space row co-ordinate Vr0 is within the row region where the low-pass filtered pixel B(i, j) belongs to can be determined by determining whether the absolute value of the second addressing space row co-ordinate Vr0 is smaller than 0.5.

In step 314, determine whether C1, the corresponding low-pass filtered image density column average of the low-pass filtered pixel B(i, j) is the median of column averages C0, C1 and C2. If so, proceed to step 318 to set MarkR(i, j), a row mark value of the low-pass filtered pixel B(i, j), to be a first value, say, 255 for instance; otherwise, proceed to step 320 to set MarkR(i, j) to be a second value, say, 128 for instance. In the wake of 318 and step 320, proceed to step 322.

In step 322, determine whether Cmax-Cmin is larger than a tolerance value, where Cmed=R1, CMax>0.5, CMin<0.5. If so, proceed to step 324; otherwise, proceed to step 338.

In step 324, use the interpolation method to obtain the second addressing space column co-ordinate Vc0 whose low-pass filtered image density is approximate to the pre-determined value, which is 0.5, according to row averages C0, C1 and C2. Referring to FIG. 5. Similarly, by means of the segment formed by (−1, C0) and (0, C1) and the segment formed by (0, C1) and (1, C2), the second addressing space column co-ordinate Vc0 whose low-pass filtered image density equals 0.5 can be obtained via interpolation method.

Next, proceed to step 326: determine whether the second addressing space column co-ordinate Vc0 is within the corresponding column region of the low-pass filtered pixel B(i, j). If so, proceed to step 328; otherwise, proceed to step 334 to set both the row mark value MarkR(i, j) and the column mark value MarkC(i, j) to be 0. In step 328, determine whether the corresponding low-pass filtered image density row average R1 of the low-pass filtered pixel B(i, j) is the median of row averages R0, R1 and R2. If so, proceed to step 330 to set MarkC(i, j), a column mark value of the low-pass filtered pixel B(i, j), to be the first value; otherwise, proceed to step 332 to set MarkC(i, j) to be the second value.

Following step 330 and step 332, proceed to step 336 to record the second addressing space row co-ordinate Vr0 and the second addressing space column co-ordinate Vc0, and set the second addressing space co-ordinates (Vr0, Vc0) to be the key point KP(i, j). Meanwhile, the value of the low-pass filtered pixel B(i, j) corresponding to the contour function Contour(i, j) is set to be (Vr0, Vc0), wherein the absolute values of Vr0 and Vc0 are smaller than 0.5. Then, proceed to step 338 to determine whether all the pixels have been processed. If so, proceed to step 602; otherwise, return to step 340 of FIG. 3A, proceed to the next pixel and re-do step 302.

Figure 6A:
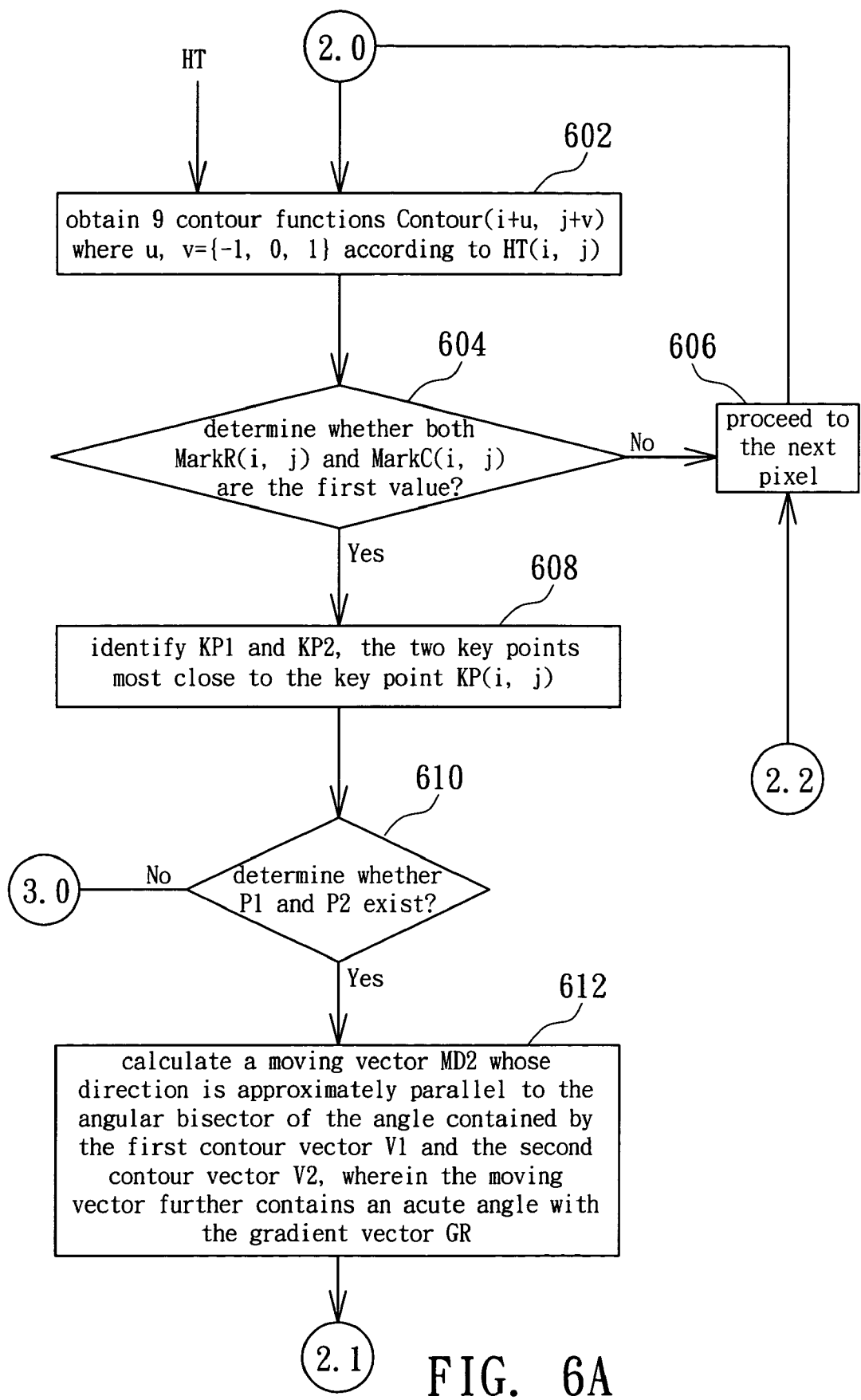
FIGS. 6A and 6B are detailed flowchart of step 210 of determining whether the key point KP(i, j) corresponds to convex image region or a concave image region and obtaining a corresponding moving vector of the key point KP(i, j)
Figure 6B:
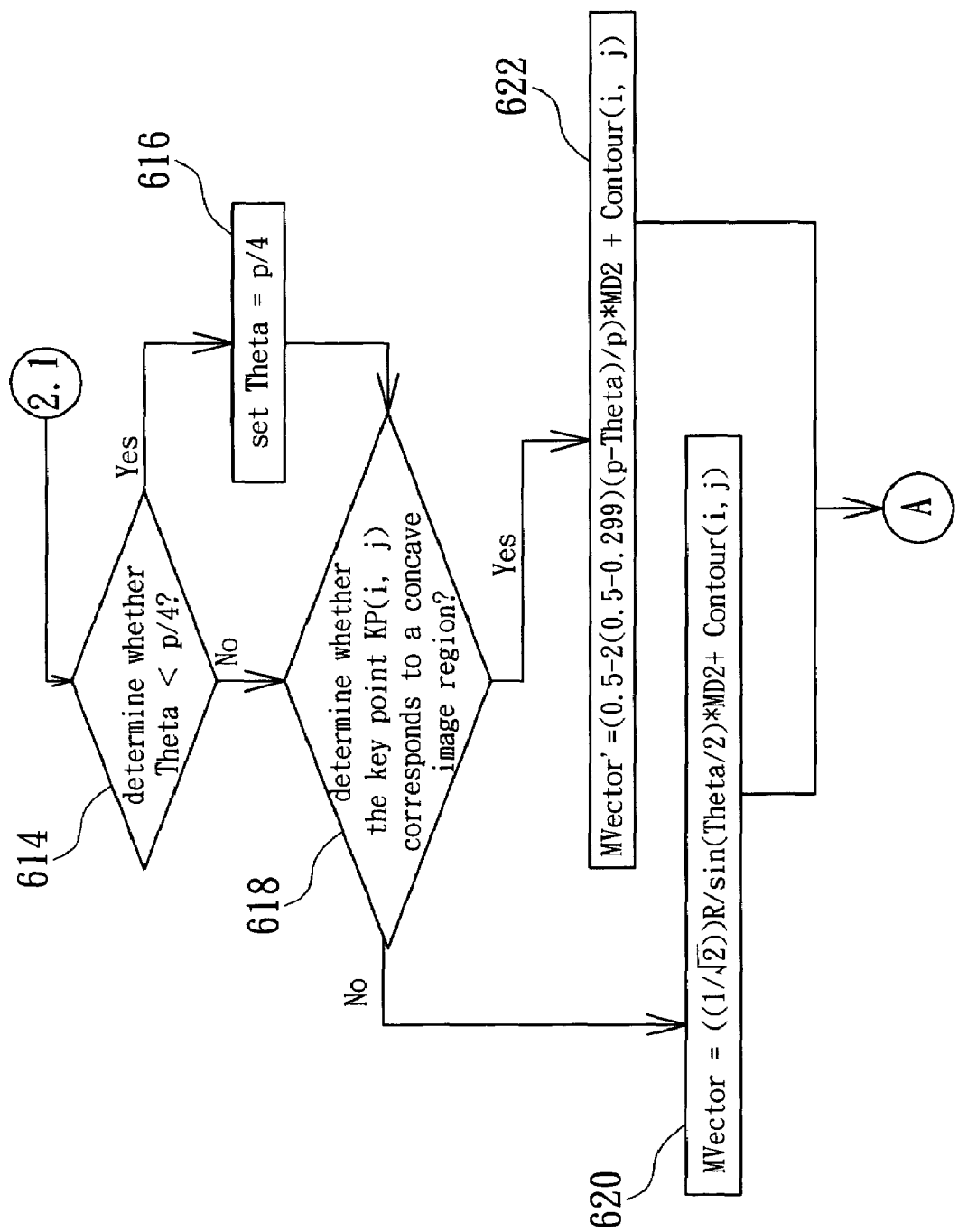

Referring to FIGS. 6A and 6B, a detailed flowchart of step 210 of determining whether the key point KP(i, j) corresponds to a convex image region or a concave image region and obtaining a moving vector corresponding to the key point KP(i, j). Firstly, proceed to step 602 to obtain 9 contour functions Contour(i+u, j+v) where u, v={−1, 0, 1} according to HT(i, j). Next, proceed to step 604 to determine whether both the column mark value MarkC(i, j) and the row mark value MarkR(i, j) are first values. If so, the display point of the halftone pixel (i, j) needs to be shifted, then proceed to step 608; otherwise, proceed to step 606 to proceed to the next pixel, then return to step 602.

Figure 7A:
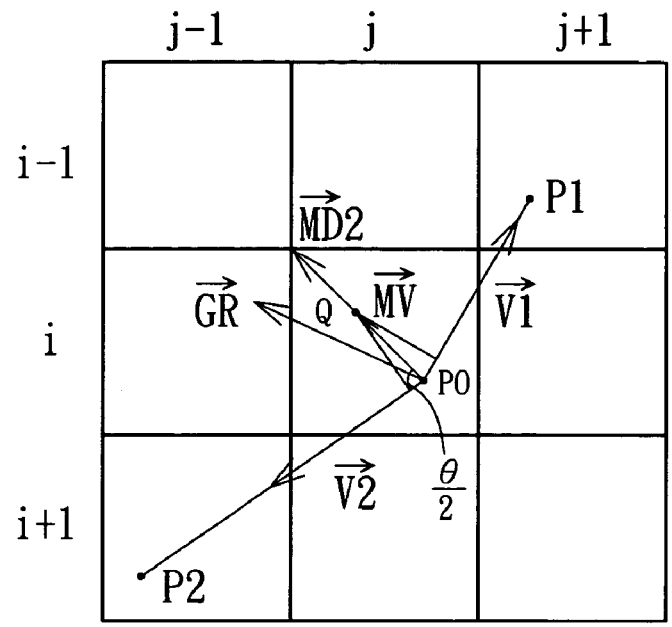
FIGS. 7A and 7B are vector diagrams when the key point KP(i, j) corresponds to a convex image region and a concave image region respectively.
Figure 7B:
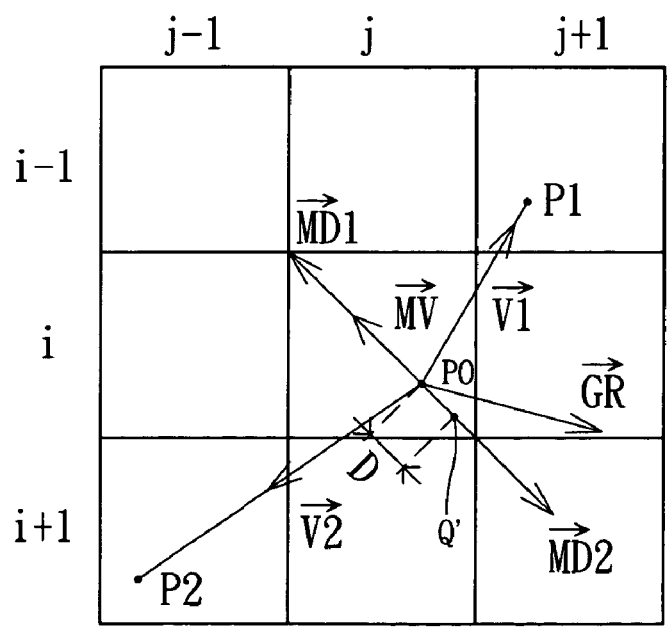

In step 608, the identifying method to obtain KP1 and KP2, the two key points most close to the key point KP(i, j), is disclosed below. Referring to FIGS. 7A and 7B, diagrams showing the vector relationship when the key point KP(i, j) corresponds to a convex image region and a concave image region respectively. Suppose a pooled co-ordinate obtained by aliasing the first addressing space with the second addressing space. The co-ordinate values of the pooled co-ordinates are the summation of the co-ordinate values of the first addressing space co-ordinates and the co-ordinate values of the second addressing space co-ordinates. Let the pooled co-ordinate values of KP(i, j) be P0=Contour(i+j)+(i, j). Next, determine whether there exists a Contour(m, n) that satisfies MarkR(m, n)>0 or MarkC(m, n)>0, where i−1<=m<=i+1, j−1<=n<=j+1, and (m, n)≠(i, j). If so, let P1 and P2 be the two points obtained from the pooled co-ordinate values whose difference with Contour(m, n)+(m, n) and Contour(i, j)+(i, j) are the smallest. P1 and P2 are exactly the pooled co-ordinate values of KP1 and KP2, wherein the distance between P1 and P and the distance between P2 and P are shortest. Then, proceed to step 610 to determine whether P1 and P2 exist or not. If so, proceed to step 612; otherwise, proceed to step 902 of FIG. 9.

In step 612, firstly, calculate a row density change RowP and a column density change ColP of the corresponding local region of the low-pass filtered pixel B(i, j), wherein the low-pass filtered pixel B(i, j) is the center of the 3×3 pixel matrix:

$$RowP = B(i+1, j-1) - B(i-1, j-1) + B(i+1, j) - B(i-1, j) + B(i+1, j+1) - B(i-1, j+1); \text{ and}$$

ColP=B(i−1,j+1)−B(i−1,j−1)+B(i,j+1)−B(i,j−1)+B(i+1,j+1)−B(i+1,j−1).

Next, obtain a gradient vector GR according to the row density change RowP and the column density change: ColP=<RowP, ColP>/||<RowP, ColP>||, wherein ||V|| is the length of any vector V, GR is the gradient oriented toward higher densities. After that, obtain a first contour vector V1 and a second contour vector V2 whose initial point is the key point KP(i, j) and respective destinations are KP1 and KP2, wherein V1=<P1−P0>/||P1−P0||, V2=<P2−P0>/||P2−P0||.

Next, obtain a moving vector MD2 whose direction is roughly parallel to the angular bisector of the angle contained by the first contour vector V1 and the second contour vector V2, wherein the moving vector further forms an acute angle with the gradient vector GR. The method of obtaining the moving vector MD2 is disclosed below. Firstly, set a vector MV to be as follows:

$$MV = (V1+V2)/2; \text{ if } (\|V1+V2\|) > 0.2$$
$$= (V1-V2)*\begin{bmatrix} 0 & 1 \\ -1 & 0 \end{bmatrix};$$

otherwise

Next, let a vector MD1 be equal to MV/||MV||, obtain the contained angle between V1 and V2 as Theta=Cos−1 (V1*V2), and further let the value of function Sign be as follows:

$$\text{Sign} = +1; \text{ if } (MD1 \cdot GR) > 0$$
$$= -1; \text{ otherwise}$$

Next, let the moving vector MD2 be equal to Sign*MD1, wherein "*" denotes a multiplication operator, "·" denotes an inner product operator, the moving vector MD2 is a unit vector whose length equals 1 unit.

After that, proceed to step 614 to determine whether the contained angle Theta is smaller than π/4. If so, proceed to step 616 to set the contained angle Theta to be π/4 lest errors might occur if the contained angle is too small; otherwise, proceed to step 618.

In step 618, determine whether the key point KP(i, j) corresponds to a convex image region or a concave image region according to the relationship between the moving vector MD2 and the first contour vector V1 and the second contour vector V2. Whether the key point KP(i, j) corresponds to a convex image region or a concave image region can be determined according to the values of (MD2·V1) and (MD2·V2).

When both the contained angle between the moving vector MD2 and the first contour vector V1 and the contained angle between the moving vector MD2 and the second contour vector V2 are less than π/2, the values of (MD2·V1) and (MD2·V2) are both positive, meanwhile, the images in the neighborhood of the key point KP(i, j) form a convex image region as illustrated in FIG. 7A. When both the contained angle between the moving vector MD2 and the first contour vector V1 and the contained angle between the moving vector MD2 and the second contour vector V2 are greater than π/2, the values of (MD2·V1) and (MD2·V2) are both negative, meanwhile, the images in the neighborhood of the key point KP(i, j) form a concave image region as illustrated in FIG. 7B.

In step 618, proceed to step 620 if the key point KP(i, j) is determined to be corresponding to a convex image region; otherwise, proceed to step 622 if the key point KP(i, j) is determined to be corresponding to a concave image region.

Figure 8A:
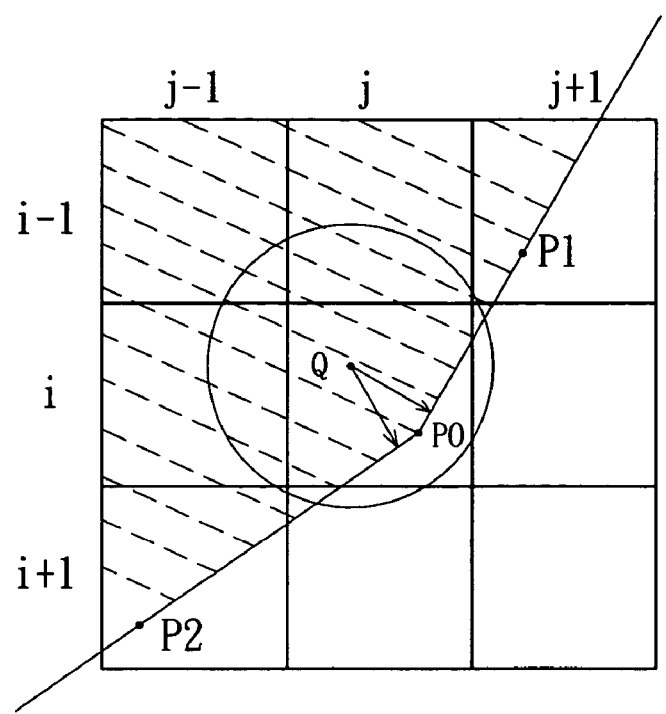

The slope-lined region is a region with higher low-pass filtered densities. In step 620, obtain a reference point Q, wherein the distance from the reference point Q to the first contour vector V1 equals (1/t) times the length of R, the radius of the display point, while the distance from the reference point Q to the first contour vector V2 also equals (1/t) times the length of R, t is preferably to be $\sqrt{2}$. When t equals $\sqrt{2}$, the length of the segment P0Q equals $(1/\sqrt{2})R/\sin(\text{Theta}/2)$, while vector P0Q equals $((1/\sqrt{2})R/\sin(\text{Theta}/2))*MD2$. The second addressing space co-ordinates of the reference point Q can be expressed as $((1/\sqrt{2})R/\sin(\text{Theta}/2))*MD2+\text{Contour}(i, j)$. Likewise, the moving vector MVector, whose initial point is O, the original point of the co-ordinates, i.e., the central point of the halftone pixel HT(i ,j), and destination point is Q, can be expressed as $((1/\sqrt{2})R/\sin(\text{Theta}/2))*MD2+\text{Contour}(i, j)$. FIG. 8A shows the relationship between a convex image region and a circle whose center is Q and radius is R.

Figure 8B:
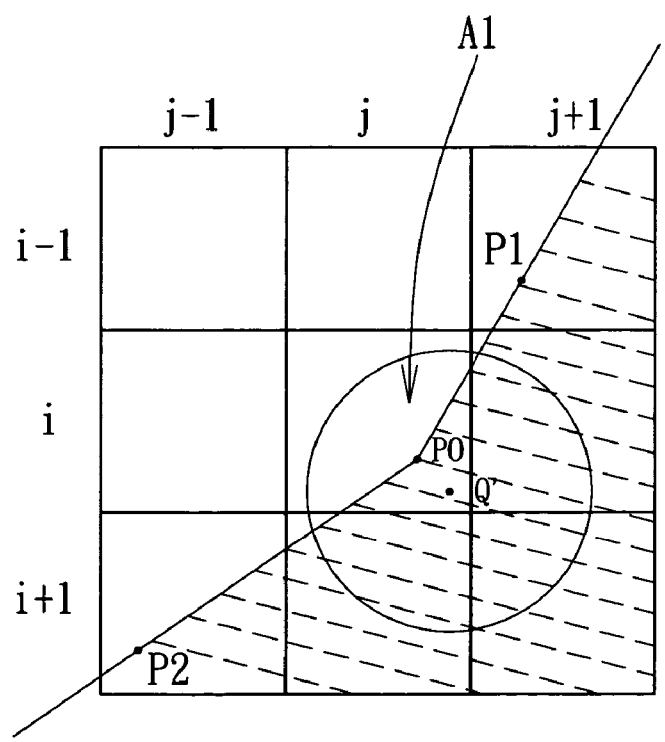
FIG. 8B is a diagram shows the relationship between a concave image region and a circle whose center is Q' and radius is R.

In step 622, obtain a circled region whose center is reference point Q' and radius is R, wherein the area of sector A1 formed by the circled region, the first contour vector V1 and the second contour vector V2 is pre-determined. Referring to FIG. 8B, a diagram shows the relationship between a concave image region and a circle whose center is Q' and radius is R. The pre-determined area is preferably to be (π/2−1)/4. To obtain a reference point Q' which better satisfies the pre-determined area, the position of the reference point Q' can be obtained via interpolation method according to the contained angle Theta and the distance between the reference point Q' and the key point KP(i, j) as listed in Table 2. Let Theta=π and Theta=π/2 be the two ends of interpolation, then D, the distance of the segment P2 Q', can be expressed as:

$$D=(0.5-2(0.5-0.299)(\pi-\text{Theta})/\pi),$$

while vector P0 Q' can be expressed as:

$$P0Q'=(0.5-2(0.5-0.299)(\pi-\text{Theta})/\pi)*MD2.$$

The second addressing space co-ordinate of the reference point can be expressed as:

$$(0.5-2(0.5-0.299)(\pi-\text{Theta})/\pi)*MD2+\text{Contour}(i, j).$$

Meanwhile, the moving vector MVector', whose initial point is the co-ordinate origin O and destination point is Q', $$MVector'=(0.5-2(0.5-0.299)(\pi-\text{Theta})/\pi)*MD2+\text{Contour}(i, j).$$

TABLE 2

| Theta | Distance between reference point and key point KP(i, j) |
|---|---|
| π | 0.5 |
| 9π/10 | 0.462 |
| 8π/10 | 0.4251 |
| 7π/10 | 0.3871 |
| 6π/10 | 0.3471 |
| π/2 | 0.299 |

Next, proceed to step 624 to determine whether the halftone HT(i, j) is at an ON state. If so, proceed to step 628; otherwise, proceed to step 626. In step 628, the center of the display point is moved from O, the center of the halftone pixel HT(i, j), up to the length of the moving vector along the direction of the moving vector. Then, proceed to step 630 to determine whether all of the pixels have been processed. If so, proceed to step 212; otherwise, return to step 606. In step 626, add a second display point to the halftone pixel HT(i, j) if the density of any of the continuous tone pixel disposed at the corresponding local region of the halftone pixel HT(i, j), i.e., a 3×3 pixel matrix whose center is HT(i, j), is larger than a high critical density, say, 0.8. If the condition that the density of any continuous tone pixel is larger than a high critical value holds true, proceed to step 628, set the second addressing space co-ordinates of the moving vector to be the second addressing space co-ordinates of the reference point, and further set the center of the second display point to be close to the reference point. If the condition does not hold true, proceed to step 630.

Figure 9:
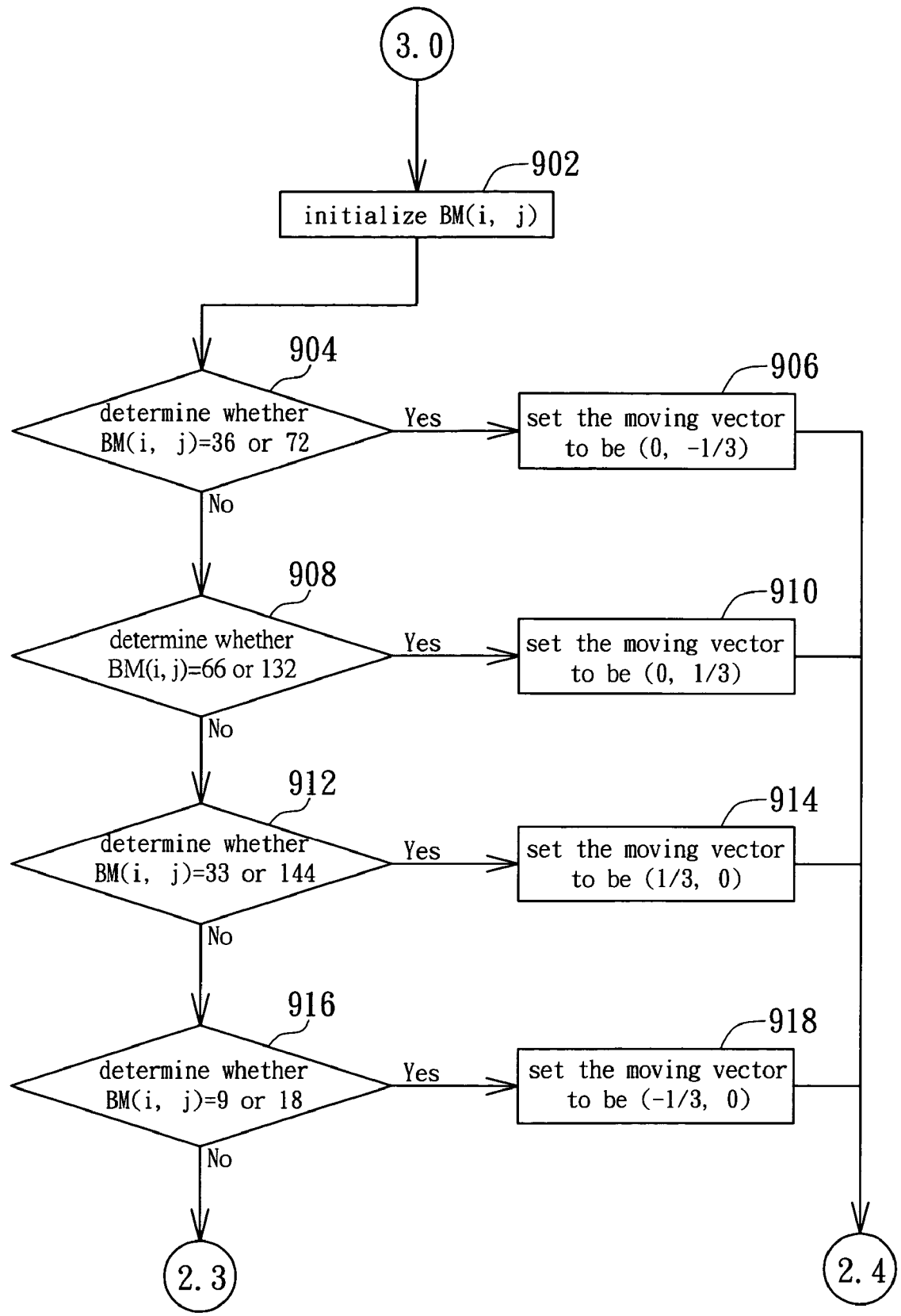
FIG. 9 is a flowchart of generating a moving vector according to a particular pattern of FIG. 10.
Figure 10:
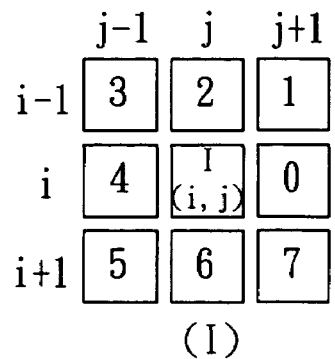
FIG. 10 are 8 particular patterns (A)~(H) which could possibly generate jaggy effect.
Figure 10:
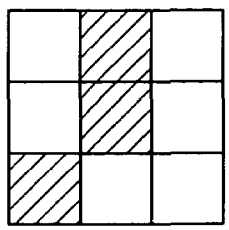
Figure 10:
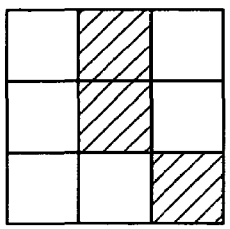
Figure 10:
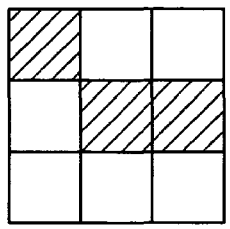
Figure 10:
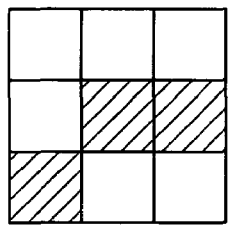
Figure 10:
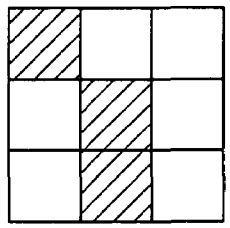
Figure 10:
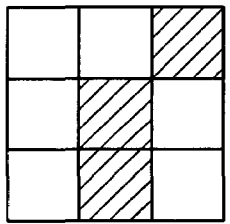
Figure 10:
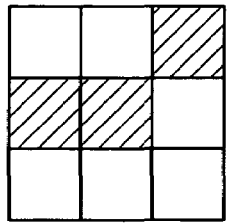
Figure 10:
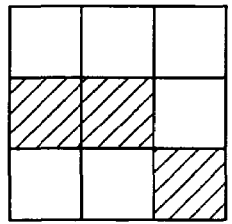

In step 610, when P1 and P2 are determined to be not existing, the invention can determine whether the corresponding continuous tone pixels of to the key point KP(i, j) dispose at the local region match a plurality of particular patterns, determine the moving vector according to the matched patterns, and further resolve the jaggy effect that could possibly be accompanied by these particular patterns. Referring to FIG. 9 and FIG. 10, a flowchart of generating a moving vector according to a particular pattern of FIG. 10 is shown in FIG. 9, while 8 particular patterns (A)~(H) which could possibly generate jaggy effect are shown in FIG. 10.

If P1 and P2 do not exist, proceed to step 902 to initialize a bit mask BM(i, j). Referring to FIG. 10(I), a diagram of a bit mask BM(i, j) is shown. The 8 bits of the bit mask BM(i, j) respectively corresponds to the 8 continuous tone pixels adjacent to the continuous tone pixel I(i, j).

Referring to FIG. 10(I), the 8 continuous tone I(i, j+1), I(i−1, j+1), I(i−1, j), I(i−1, j−1), I(i, j−1), I(i+1, j−1), I(i+1, j) and I(i+1, j+1), which respectively corresponds to bit 0~bit 7 of the bit mask (i, j) are shown. Let a large density reference value LD=0.8, a small density reference value SD=0.2. When the continuous pixel density is larger than LD, the value of the corresponding bit is 1; when the continuous pixel density is smaller than SD, the value of the corresponding bit is 0. If any of the 8 continuous tone pixels adjacent to the continuous tone I(i, j) has a density value larger than SD but smaller LD, return to step 630.

Of the 8 particular patterns shown in FIGS. 10(A) to 10(H), the slope-lined regions represents the continuous tone pixels whose densities are larger than LD. It can be inferred from the above disclosure that the decimal values of the corresponding bit mask BM(i, j) of the 8 particular patterns shown in FIGS. 10(A) to 10(H) respectively are 36, 132, 9, 33, 72, 66, 18 and 144.

After step 902, proceed to step 904 to determine whether the value of the corresponding bit mask BM(i, j) of the continuous tone pixel I(i, j) equals 36 or 72. If so, the continuous tone pixel I(i, j) and its 8 adjacent pixels match FIGS. 10(A) and 10(E), proceed to step 906 to set the moving vector to be (0, −1/3); otherwise, proceed to step 908.

In step 908, determine whether the value of the corresponding bit mask BM(i, j) of the continuous tone pixel I(i, j) equals 66 or 132. If so, the continuous tone pixel I(i, j) and its 8 adjacent pixels match FIGS. 10(B) and 10(F), proceed to step 910 to set the moving vector to be (0, 1/3); otherwise, proceed to step 912.

In step 912, determine whether the value of the corresponding bit mask BM(i, j) of the continuous tone pixel I(i, j) equals 33 or 144. If so, the continuous tone pixel I(i, j) and its 8 adjacent pixels match FIGS. 10(D) and 10(H), proceed to step 914 to set the moving vector to be (1/3, 0); otherwise, proceed to step 916.

In step 916, determine whether the value of the corresponding bit mask BM(i, j) of the continuous tone pixel I(i, j) equals 9 or 18. If so, the continuous tone pixel I(i, j) and its 8 adjacent pixels match FIGS. 10(C) and 10(G), proceed to step 914 to set the moving vector to be (−1/3, 0); otherwise, return to step 630. Following steps 906, 910, 914 and 918, return to step 628.

Figure 11:
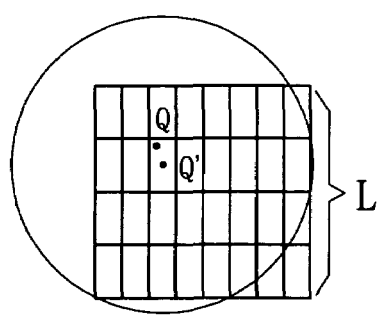
FIG. 11 is a diagram of a pixel corresponding to a low-resolution printing mode and a sub-pixel corresponding to a high-resolution printing mode.

In step 212 of FIG. 2, output the display point according to the position after regulation or output a second display point according to the position of the second output point. For ink-jet printers with low-resolution printing mode and high-resolution printing mode as well, the pixel size varies in accordance with revolution levels. Referring to FIG. 11, a diagram of a pixel corresponding to a low-resolution printing mode and a sub-pixel corresponding to a high-resolution printing mode is shown. Each pixel includes 4×8 sub-pixels for instance, wherein the position of each sub-pixel is defined by an addressing space with a higher resolution level. When outputting a display point, the invention can quantize the co-ordinates of the destination point Q of the moving vector MVector to obtain the corresponding sub-pixels of the point Q. Take FIG. 11 for example, the point Q corresponds to a sub-pixel Q" disposed at row 2 and column 3. Consequently, the ink-jet printer can take the sub-pixel Q" as the center and output dots whose radius is R to complete step 212 of outputting the display point according to the position after regulation.

Figure 12A:
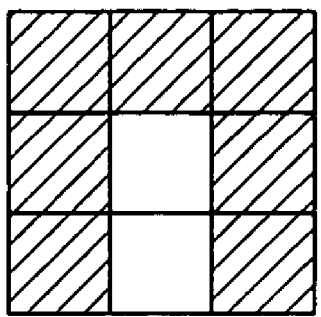
FIG. 12A is an example when a halftone pixel array is unlikely to be generated by a key point.
Figure 12B:
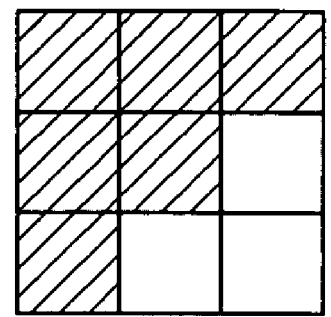
FIG. 12B is an example when a halftone pixel array is likely to be generated by a key point.

Referring to FIGS. 12A and 12B, an example when a halftone pixel array is unlikely to be generated by a key point is shown in FIG. 12A, while an example when a halftone pixel array is likely to be generated by a key point is shown in FIG. 12B. The contour path, which is formed by the key point KP(i, j) obtained in step 208 and at least two of its adjacent key points is approximately linear, corresponds to a local region where parts of the region are grouped as high density images while other parts of the region are grouped as low density images. According to the spirit of the invention, images with severe density changes will not generate any key points, so the resolution of an image will not be affected. FIG. 12A shows an image with a peak. According to step 308 of FIG. 3A, the corresponding Rmed of FIG. 12A might not equal to R1, and according to step 322 of FIG. 3B, the corresponding Cmed of FIG. 12A might not equal to C1, so the central pixel of the halftone pixel matrix will not generate any key point. Consequently, the invention will not add any display point to the central pixel. Therefore, if a peak is existed in the image, no display point will be added on the peak, and the peak will not be blurred.

In step 626, only when the density of any of the 8 adjacent continuous tone pixels of the halftone pixel HT(i, j) is larger than a high critical value, will a second display point be added to the halftone pixel HT(i, j). This is because when a display point exists in the neighborhood of the halftone pixel HT(i, j), the second display point added to the halftone pixel HT(i, j) will resolve the jaggy effect without affecting the shade of the color of the original image.

Figure 13A:
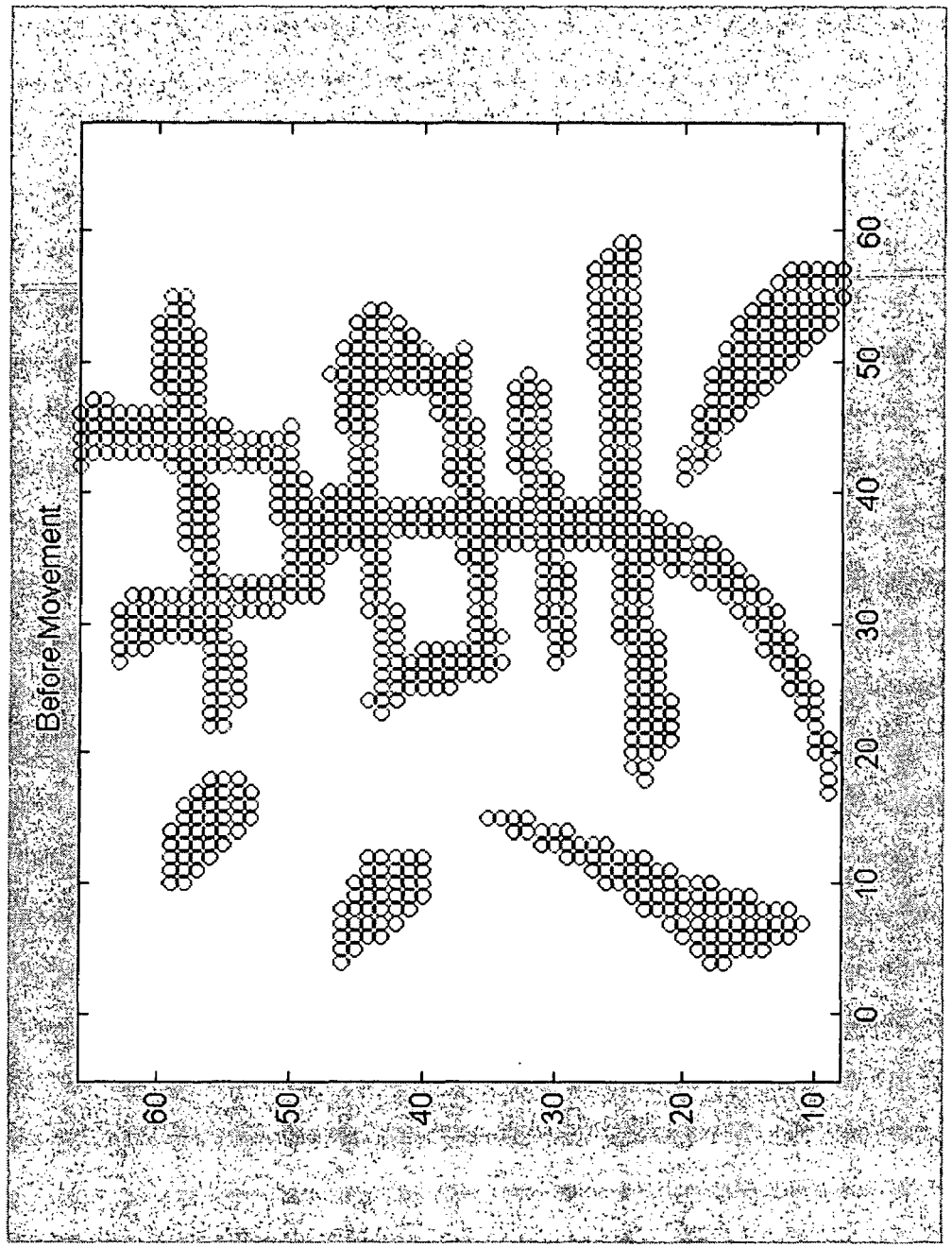
FIGS. 13A, 14A and 15A are original halftone images before the image processing method according to the invention.
Figure 13B:
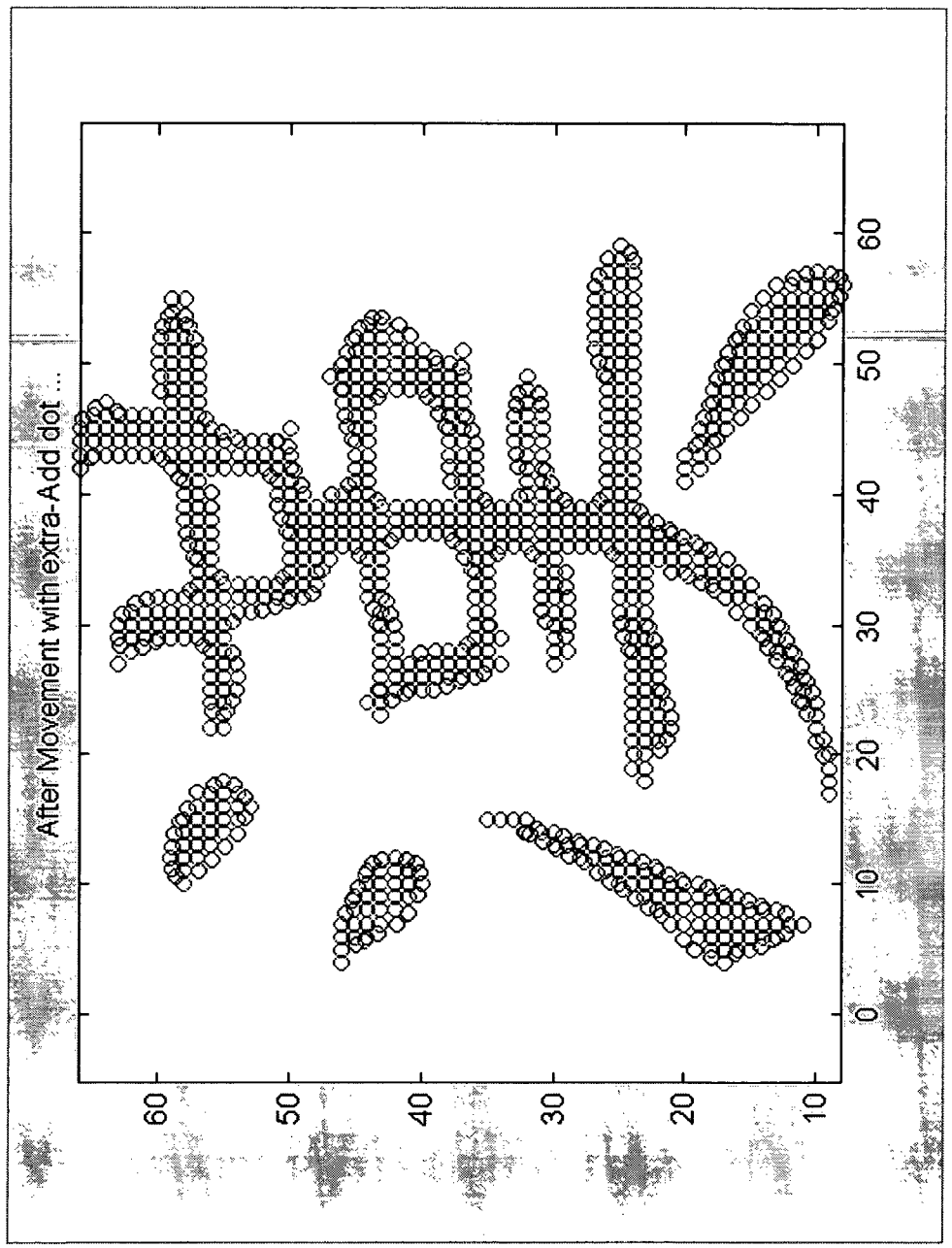
FIGS. 13B, 14B and 15B are original halftone images after the image processing method according to the invention.
Figure 14A:
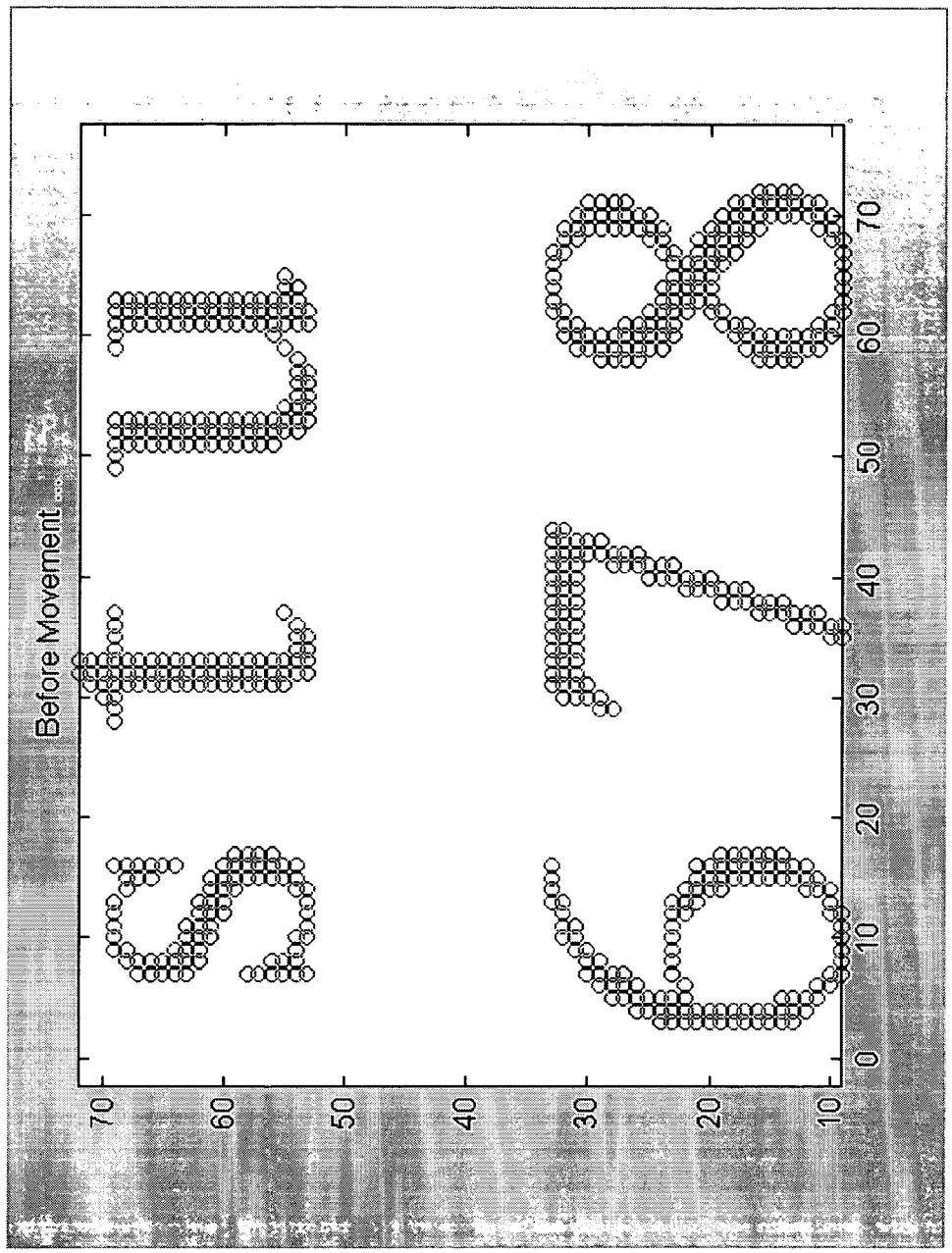
Figure 14B:
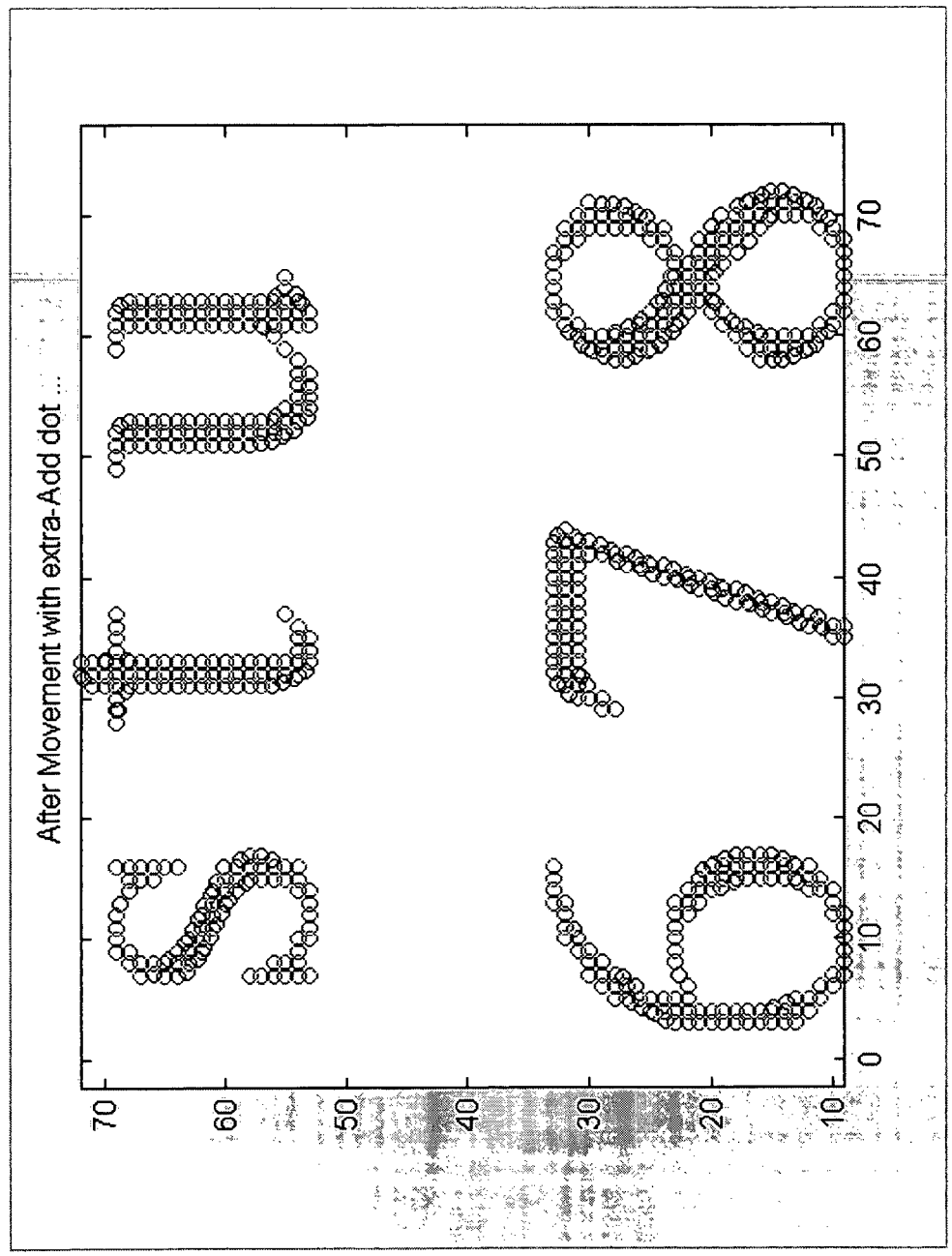
Figure 15A:
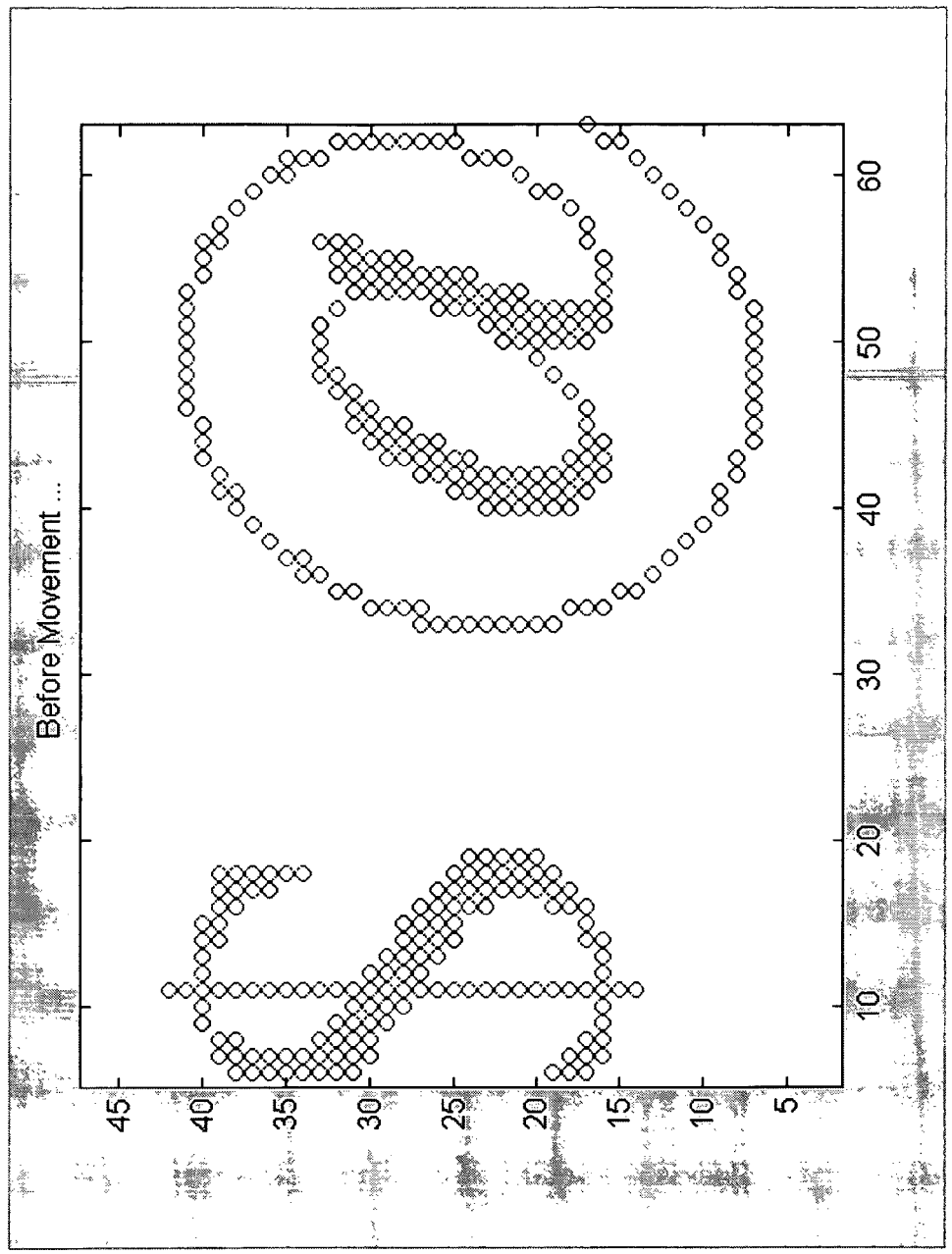
Figure 15B:
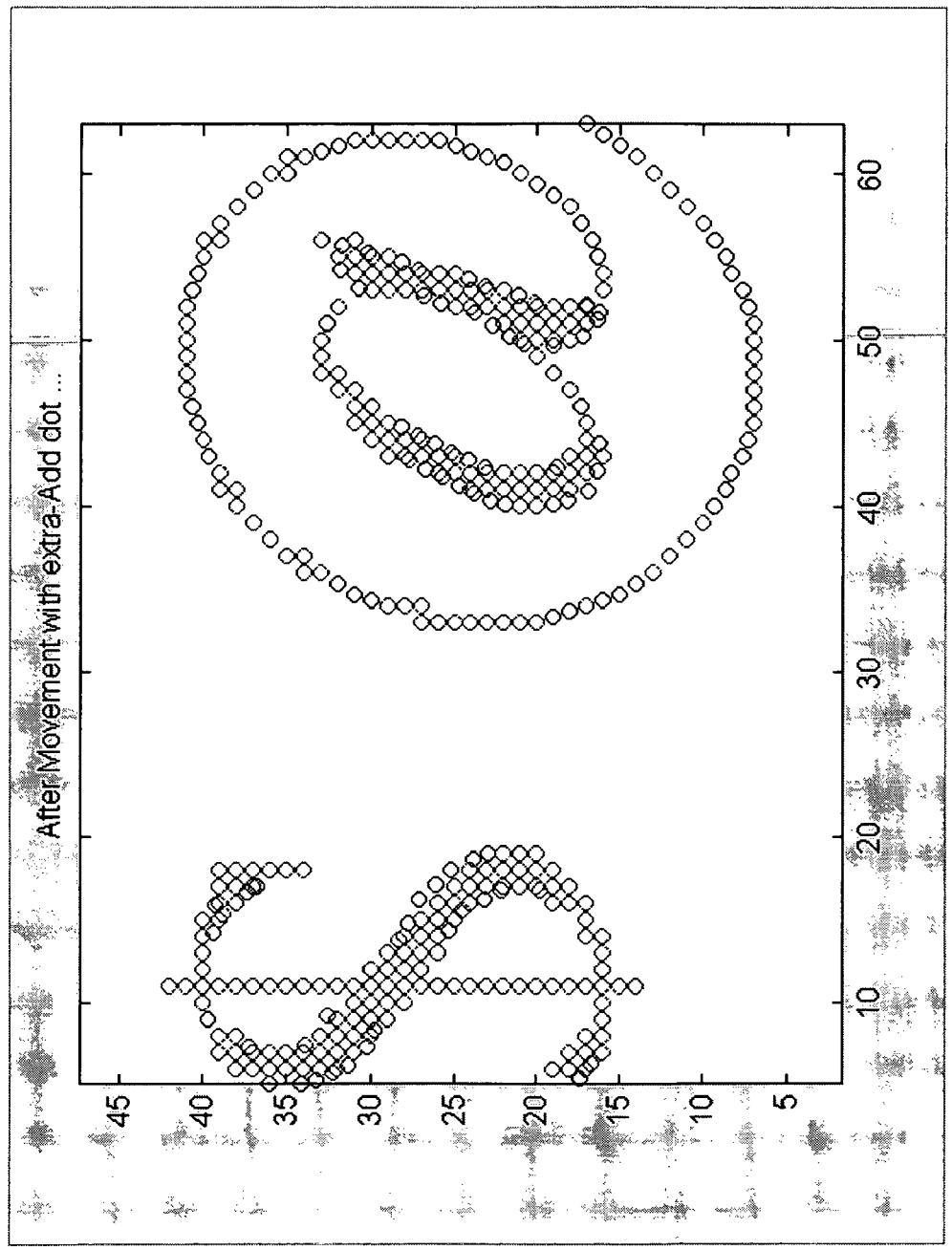

Referring to FIGS. 13A, 13B, 14A, 14B, 15A and 15B, original halftone images before the image processing method according to the invention are shown in FIGS. 13A, 14A and 15A, while original halftone images after the image processing method according to the invention are shown in FIGS. 13B, 14B and 15B. It can be seen from the simulated results that the image processing method according to the method effectively resolves the jaggy effect, hence improving image quality significantly.

Apart from being applied in ink-jet printers and multi-function machines, the invention can also be applied in printers or other image output devices having both low-resolution and high-resolution addressing spaces. The image processing method for reducing jaggy effect disclosed in the above preferred embodiment resolves the jaggy effect by means of horizontal compensation and vertical compensation without too many operations. The invention, which achieves a high-resolution image quality under a low-resolution printing mode, has the advantages of having fast image outputting and having high quality images.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method applied in an image output device for reducing jaggy effect, comprising the steps of:
    generating a continuous tone image having a plurality of continuous tone pixels, the co-ordinates of the continuous tone pixels being defined according to a first addressing space with each of the continuous tone pixels having a continuous image density and one of the continuous tone pixels being $I(i, j)$;
    halftone-processing the continuous tone image to generate a halftone image, which has a plurality of halftone pixels corresponding to the continuous tone pixels, the halftone pixels being at an ON state or an OFF state, while the halftone pixel $HT(i, j)$ corresponding to continuous tone pixel $J(i, j)$;
    low-pass filtering the continuous tone image to generate a low-pass filtered image having a plurality of low-pass filtered pixels corresponding to the continuous tone pixels, a low-pass filtered pixel $B(i, j)$ corresponding to the continuous tone pixel $(i, j)$, and each of the low-pass filtered pixels having a low-pass filtered image density;
    determining whether a position of the low-pass filtered image whose density is approximate to a pre-determined density can be obtained in the low-pass filtered pixel $B(i,j)$: if so, define the position according to a second addressing space to obtain a set of second addressing space co-ordinates $(Vr, Vc)$ of a key point $KP(i, j)$ corresponding to the positions, wherein the step of determining whether a position of the low-pass filtered image whose density is approximate to a pre-determined density can be obtained in the low-pass filtered pixel $B(i, j)$ further comprises:
    (a1) calculating plural row averages of the low-pass filtered image densities of plural rows of the low-pass filtered pixels disposed at a corresponding local region of the low-pass filtered pixel $B(i, j)$ as well as plural column averages of the low-pass filtered image densities of plural columns of the low-pass filtered pixels disposed at a corresponding local region of the low-pass filtered pixel $B(i, j)$;
    (a2) interpolating a second addressing space row co-ordinate $Vr0$ whose low-pass filtered image density is approximate to the pre-determined value according to the row averages, and if the second addressing space row co-ordinate $Vr0$ is within the corresponding row region of the low-pass filtered pixel $B(i, j)$, then proceed to step (a3), otherwise, proceed to (a4);
    (a3) determining whether the corresponding low-pass filtered image density column average of the low-pass filtered pixel $B(i, j)$ is the median of the column averages: if yes, set $MarkR(i, j)$, a row mark value of the low-pass filtered pixel $B(i, j)$, to be a first value; otherwise, set $MarkR(i, j)$ to be a second value;
    (a4) interpolation a second addressing space column co-ordinate $Vc0$ whose low-pass filtered image density is approximate to the pre-determined value according to the column averages, and if the second addressing space column co-ordinate $Vc0$ is within the corresponding column region of the low-pass filtered pixel $B(i, j)$, then proceed to step (a5), otherwise, proceed to (a6);
    (a5) determining whether the corresponding low-pass filtered image density row average of the low-pass filtered pixel $B(i, j)$ is the median of the row averages: if yes, set $MarkC(i, j)$, a column mark value of the low-pass filtered pixel $B(i, j)$, to be the first value; otherwise, set $MarkC(i, j)$ to be the second value
    (a6) recording the second addressing space row co-ordinate $Vr0$ and the second addressing space column co-ordinate $Vc0$, and setting the second addressing space co-ordinates $(Vr0, Vc0)$ to be the key point $KP(i, j)$;
    determining whether the key point $KP(i, j)$ corresponds to a convex image region or a concave image region according to the relationship between the key point $KP(i, j)$ and at least two of its adjacent key points, obtain a moving vector corresponding to the key point, and regulate the position of a display point of the halftone pixel $HT(i, j)$ according to the moving vector; and
    outputting the display point according to the position after regulation.

2. The image processing method according to claim 1, wherein an approximately linear contour path is formed by the key point $KP(i, j)$ and at least two of its adjacent key points.

3. The image processing method according to claim 1, wherein the first addressing space is a low-resolution addressing space, while the second addressing space is a high-resolution addressing space.

4. The image processing method according to claim 1, wherein the image processing method is applied in a printer.

5. The image processing method according to claim 1, wherein the image processing method is applied in an ink-jet printer.

6. The image processing method according to claim 1, wherein the display point comprises cyaneus (C), magenta (M), yellow (Y) and black (K) dots.

7. The image processing method according to claim 1, wherein the key point $KP(i, j)$ and two of its adjacent key points correspond to a first contour vector and a second contour vector, when the key point $KP(i, j)$ corresponds to a convex image region, the distance between the first contour vector and a corresponding reference point of the moving vector equals $(1/t)$ times the radius of the display point, while the distance from the reference point Q to the first contour vector V2 also equals $(1/t)$ times the radius of the display point, t is a positive real number.

8. The image processing method according to claim 7, where t equals $\sqrt{2}$.

9. The image processing method according to claim 1, wherein the key point $KP(i, j)$ and two of its adjacent key points correspond to a first contour vector and a second contour vector, a pre-determined area of a sector region is formed by the first contour vector, the second contour vector, and a circular region whose center is a corresponding reference point of the moving vector and radius is the radius of the display point.

10. The image processing method according to claim 9, wherein the pre-determined area is $(\pi/2-1)/4$ times the area of a halftone pixel.

11. The image processing method according to claim 1, wherein the step of determining whether the key point KP(i, j) corresponds to a convex image region or a concave image region further comprises:
- (b1) proceeding to step (b2) if both the column mark value MarkC(i, j) and the row mark value MarkiR(i, j) of the low-pass filtered pixel are the first value;
- (b2) identifying KP1 and KP2, the two key points most close to the key point KP(i, j);
- (b3) calculating a row density change and a column density change of the corresponding local region of the low-pass filtered pixel, and obtaining a gradient vector GR according to the row density change and the column density change;
- (b4) obtaining a first contour vector V1 and a second contour vector V2 whose initial point is the key point KP(i, j) and respective destinations are the key point KP1 and the key point KP2, and obtaining a moving vector whose direction is approximately parallel to the angular bisector of the angle contained by the first contour vector V1 and the second contour vector V2, the moving vector further containing an acute angle with the gradient vector GR;
- (b5) determining whether the key point KP(i, j) corresponds to a convex image region or a concave image region according to the moving vector, the first contour vector and the second contour vector: proceed to step (b6) if the key point KP(i, j) corresponds to a convex image region and proceed to step (b7) if the key point KP(i, j) corresponds to a concave image region;
- (b6) obtaining a reference point, the distance between the reference point and the first contour vector being equal to (1/t) times the radius of the display point, and the distance between the reference point and the second contour vector also being equal to (1/t) times the radius of the display point, t being a positive real number;
- (b7) obtaining a reference point which is used as the central point of a circular region whose radius equals the radius of a display point, the area of a sector region formed by the circular region, the first contour vector, and the second contour vector being a pre-determined area;
- (b8) obtaining the moving vector whose initial point is set to be the original point of the second addressing space co-ordinate and destination is set to be the reference point.

12. The image processing method according to claim 11, wherein t equals $\sqrt{2}$, while the pre-determined is $(\pi/2-1)/4$ times the area of a halftone pixel-determined area is $(\pi/2-1)/4$ times the area of a halftone pixel.

13. The image processing method according to claim 11, wherein the key point KP(i, j) corresponds to the concave image region if the inner product of the moving vector and the first contour vector is negative and so is the inner product of the moving vector and the second contour vector.

14. The image processing method according to claim 11, wherein the key point KP(i, j) corresponds to the convex image region if the inner product of the moving vector and the first contour vector is positive and so is the inner product of the moving vector and the second contour vector.

15. The image processing method according to claim 11, wherein the inter-phase between step (b7) and step (b8) further comprises:
- (c1) determining whether the halftone pixel HT(i, j) is at an ON state: if yes, proceed to step (c2), otherwise, proceed to step (c3);
- (c2) moving the center of the display point to be close to the reference, then proceeding to step (b8); and
- (c3) adding a second display point to the halftone pixel HT(i, j) if the density of any of the continuous tone pixel disposed at the corresponding local region of the halftone pixel HT(I, j) is larger than a high critical density, the center of the second display point being close to the reference point.

16. The image processing method according to claim 15, wherein the step of regulating the position of the display point of the halftone pixel HT(i, j) according to the moving vector comprises:
outputting the display point according to the position after regulation or outputting the second display point according to the position of the second display point.

17. The image processing method according to claim 1, wherein the image processing method further comprises:
determining whether the corresponding local region of the key point KP(ii, j) match one of a plurality of particular patterns: if yes, obtain the moving vector according to the matched particular pattern.

18. The image processing method according to claim 1, wherein the low-pass filter processing is a processing of anti-aliasing algorithm.

19. The image processing method according to claim 1, wherein the low-pass filter processing is a Gaussian-blurred processing.

* * * * *